US008860760B2

(12) United States Patent
Chen et al.

(10) Patent No.: US 8,860,760 B2
(45) Date of Patent: Oct. 14, 2014

(54) AUGMENTED REALITY (AR) SYSTEM AND METHOD FOR TRACKING PARTS AND VISUALLY CUEING A USER TO IDENTIFY AND LOCATE PARTS IN A SCENE

(75) Inventors: Steven L. Chen, Thousand Oaks, CA (US); Austin Eliazar, Morrisville, NC (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 529 days.

(21) Appl. No.: 13/236,363

(22) Filed: Sep. 19, 2011

(65) Prior Publication Data

US 2012/0075343 A1 Mar. 29, 2012

Related U.S. Application Data

(60) Provisional application No. 61/386,480, filed on Sep. 25, 2010.

(51) Int. Cl.
| | | |
|---|---|---|
| G09G 5/00 | (2006.01) | |
| G06K 9/00 | (2006.01) | |
| G06T 7/00 | (2006.01) | |
| G06T 19/00 | (2011.01) | |
| G09G 5/397 | (2006.01) | |
| G06F 3/14 | (2006.01) | |

(52) U.S. Cl.
CPC .............. *G09G 5/397* (2013.01); *G06T 7/0042* (2013.01); *G06G 2380/14* (2013.01); *G06F 3/1431* (2013.01); *G06T 2207/30164* (2013.01); *G09G 2370/16* (2013.01); *G09G 2340/125* (2013.01); *G06T 19/006* (2013.01); *G06T 2207/30244* (2013.01)

USPC .......................................... 345/633; 382/103

(58) Field of Classification Search
CPC ......... G06F 3/011; G06F 3/013; G06F 3/005; G06F 3/017; G06T 19/006
See application file for complete search history.

(56) References Cited

U.S. PATENT DOCUMENTS

| | | | |
|---|---|---|---|
| 6,037,914 | A | 3/2000 | Robinson |
| 6,345,207 | B1 | 2/2002 | Nitta et al. |
| 6,356,437 | B1 | 3/2002 | Mitchell et al. |
| 7,110,909 | B2 | 9/2006 | Friedrich et al. |
| 7,126,558 | B1 | 10/2006 | Dempski |
| 7,138,963 | B2 | 11/2006 | Hobgood et al. |
| 7,324,081 | B2 | 1/2008 | Friedrich et al. |
| 7,372,451 | B2 | 5/2008 | Dempski |
| 7,676,294 | B2 | 3/2010 | Baier et al. |
| 2010/0158310 | A1* | 6/2010 | McQueen et al. ............ 382/100 |
| 2010/0199232 | A1* | 8/2010 | Mistry et al. .................. 715/863 |
| 2010/0238161 | A1* | 9/2010 | Varga et al. ................... 345/419 |
| 2011/0252320 | A1* | 10/2011 | Arrasvuori et al. ........... 715/704 |

OTHER PUBLICATIONS

Jose M. Molineros, Computer Vision and Augmented Reality for Guiding Assembly, PHD Thesis, The Pennsylvania State University, May 2002.*

(Continued)

*Primary Examiner* — Tize Ma
(74) *Attorney, Agent, or Firm* — Eric A. Gifford

(57) ABSTRACT

An AR system both identifies and visually tracks parts for a user by maintaining spatial awareness of the user's pose and provides instructions to the user for the use of those parts. Tracking the identified parts, both inside and outside the current Field of View (FOV), and any missing parts for use with the current instruction improves the effectiveness and efficiency of both novice and experienced user alike.

20 Claims, 10 Drawing Sheets

(56) References Cited

OTHER PUBLICATIONS

Henderson et al., "Evaluating the Benefits of Augmented Reality for Task Localization in Maintenance of an Armored Personnel Carrier Turret," Columbia University, IEEE International Symposium on Mixed and Augmented Reality 2009, Science and Technology Proceedings, pp. 19-22 October, Orlando, Florida, USA.

Metaio Augmented Solutions, "Augmented Reality in Industrial Prototyping," Whitepaper version 1.0, Munich, Germany, Dec. 1, 2008, pp. 1-9.

Molineros, et al., "Computer Vision for Guiding Manual Assembly," International Symposium on Assembly and Task Planning, Soft Research Park, Fukuoka, Japan May 28-29, 2001, pp. 362-368.

Pang et al, "Assembly Design and Evaluation in an Augmented Reality Environment," National University of Singapore, 2Massachusetts Institute of Technology, pp. 1-6.

Reiners et al., "Augmented Reality for Construction Tasks: Doorlock Assembly," Fraunhofer IGD Department Visualization and Virtual Reality, Rundeturmstraβe 6, 64283 Darmstadt Germany, pp. 1-10.

Tang et al., "Comparative Effectiveness of Augmented Reality in Object Assembly," CHI 2003: New Horizons, Paper: New Techniques for Presenting Instructions and Transcripts, and Transcripts, vol. No. 5, Issue No. 1, pp. 73-80.

\* cited by examiner

AUGMENTED REALITY (AR) SYSTEM AND METHOD FOR TRACKING PARTS AND VISUALLY CUEING A USER TO IDENTIFY AND LOCATE PARTS IN A SCENE

CROSS-REFERENCE TO RELATED APPLICATIONS

This application claims benefit of priority under 35 U.S.C. 119(e) to U.S. Provisional Application No. 61/386,480 entitled "Augmented Reality (AR) System for Tracking Parts and Visually Cueing a User to Identify and Locate Parts in a Scene" and filed on Sep. 25, 2010, the entire contents of which are incorporated by reference.

BACKGROUND OF THE INVENTION

1. Field of the Invention

This invention relates to augmented reality (AR) systems that provide instructions to guide a user's retrieval and use of parts in the performance of a task and more specifically to an AR system that identifies and tracks the parts throughout a natural scene and visually cues the user to identify and locate parts both inside and outside the user's current field-of-view (FOV) to execute each instruction.

2. Description of the Related Art

Augmented Reality (AR) refers to the computer generation of 2D or 3D graphics or other media such that they are rendered and overlaid on and registered with the displayed images of surrounding objects in the environment. Applying AR to tasks such as maintenance or assembly involving parts and equipment makes it possible for users to be trained for those tasks, and actively assisted during their performance, without ever needing to refer to separate paper or technical manuals. Incorporating instruction and assistance directly within the task domain, and directly referencing the parts and equipment at which the user is looking, eliminates the need for personnel to continually switch their focus of attention between the tasks and the manuals.

Many AR systems in use today utilize a video camera and computer vision algorithms to find and identify predetermined visible patterns in the scene. Such patterns might be specially designed fiducial markers (e.g. a 2D bar code) or they might simply be pre-stored images or photographs that exhibit unique structure. Having found a visible pattern in the scene, the AR system can then infer the 6-dimensional pose (X/Y/Z position and roll/pitch/yaw angular orientation) of the camera with respect to the visible pattern. If the visible pattern is known to be fixed to a specific location in the world, the AR system may calculate the position of the camera within the world. The AR system can render graphics that overlay the image of the world captured by the camera in such a way that those graphics would point to specific physical locations in the scene. Alternatively, the AR system can render graphics that have a pre-determined three-dimensional relationship to a moveable object in the scene, provided that one or more of the visible patterns in the scene has a known and fixed spatial relationship to the moveable object in question.

As the camera moves through the scene, the image of the visible pattern changes according to the camera's new position or orientation. Computer vision algorithms can re-compute the new pose of the camera with respect to the visible pattern. Such computation may be simpler and faster if the visible pattern has only moved slightly compared to the last time such a computation was performed. However, if the camera moves to such an extent that the visible pattern partially or fully departs the visible scene (or the visible pattern becomes occluded by other objects in the scene), it is no longer possible to compute the pose of the camera by analysis of that visible pattern. Under such circumstances, many AR systems lose knowledge of their location with respect to the world or lose knowledge of the location of the object to which the visible pattern is attached. Such knowledge may be re-acquired anew only when the visible pattern returns to the scene in a fully visible manner. Therefore, during the time that the visible pattern is not in the field of view, an AR system may lose the ability to correctly render graphics that refer to physical locations or objects in the scene. Alternately, the AR system can attempt to acquire a different visual pattern in the currently visible scene and restart the process anew.

SUMMARY OF THE INVENTION

The present invention provides an AR system that both identifies and visually tracks parts for a user by maintaining spatial awareness of the user's pose and locations of identified parts and provides instructions to the user for the retrieval and use of those parts in the performance of a task.

This is accomplished with an AR system that acquires and then tracks the parts, both inside and outside a current FOV over a larger field-of-regard (FOR), to cue the user to parts both inside and outside the current FOV in the performance of the current instruction of the task. The AR system provides a more complete and robust spatial awareness of the parts beyond the user's current FOV that are needed to perform the task. This improves the effectiveness and efficiency of both novice and experienced user alike. Furthermore, the AR system does not have to reacquire a part that departs and then reenters the FOV.

In an embodiment, an AR system comprises a camera for recording images within a FOV over a larger FOR in a scene including parts, a display, a computer and one or more memory units. The hardware is suitably integrated in a hand-held or head-mounted unit. Templates for the parts are stored in the one or more memory units. Templates may include specific fiducial marks provided on certain parts or points of interest, or feature sets or models of parts. Instructions including a list of parts for each instruction and instructions for the use of those parts are stored in the one or more memory units.

The computer is configured with a number of modules to track the parts and render computer-generated icons of the parts and instructions for their use. A classifier module processes images of the scene using the templates to locate and identify the parts in the scene over the FOR and store the parts' identities and locations in the one or more memory units. A pose module processes data such as the locations of identified parts or points of interest in the scene from images of the scene to estimate camera pose (coincident with user pose). The pose module may use the temporal behavior of the parts locations relative to the camera or appearance models of the parts to estimate camera pose. The same type of data may be extracted for non-part features (points of interest) in the scene. An inertial sensor on the camera may also provide data as to camera motion. An instruction module retrieves the next instruction. For each instruction, a tracker module determines from the estimated camera pose, the list of parts and the locations of those parts that lie within the current FOV and those parts that lie outside the current FOV. The tracker module may also determine if any listed parts have not yet been identified and possibly match them to parts that have been located but not yet identified.

A scene-rendering module displays the image of the scene within the current FOV on the display. This module may actively display the images on an opaque hand-held or head-mounted display, or passively display the images through a translucent head-mounted display. For each instruction, a parts rendering module renders parts icons registered to parts within the current FOV and renders parts icons with location indicators for parts outside the current FOV over the displayed images of the scene to assist the user in retrieving the parts. These location indicators may, for example, be the position of the part icon or a directional or distance indicator. The module may also render the list of parts and indicate any parts not yet identified. An instructions rendering module renders the instructions for the use of those parts. The instructions may be rendered visually over the natural scene or a computer-generated model of the scene or aurally. The instructions may include text and/or graphics.

In an embodiment, the AR system is used to assist with the assembly of parts from a modification kit onto a vehicle. The parts are suitably arranged on the ground around the vehicle in the scene. The tracker and parts rendering module track and render icons of the parts over the natural scene both inside and outside of the current FOV to assist the user to identify and locate the required parts for the current instruction. The instructions rendering module renders instructions, typically including graphics of the parts, on the display, with the rendered elements registered to the vehicle. The vehicle may be rendered as a natural image-captured by the camera, or as a computer-generated model of the vehicle. The model may be scaled down to fit into the current FOV.

In an embodiment, the classifier and pose modules interact to identify and locate parts and to estimate camera pose as the camera's FOV changes throughout the FOR. The classifier comprises a fiducial marker classifier that detects fiducial markers on parts and provides the part's identity and location and a parts classifier that uses the stored templates to detect parts and provide the part's identity and location. The classifiers may use the estimated camera pose to improve classification. The pose module comprises at least two sources selected from the fiducial marker classifier and parts classifier, a visual scene feature classifier that identifies and locates points of interest in the scene and an inertial sensor that estimates camera motion. The fiducial marker classifier also identifies and locates fiducial marks placed on points of interest in the scene. A camera pose estimator processes inputs from at least two and possibly all of these sources and generates the estimated camera pose. The camera pose estimator may use the temporal change of parts' locations or visual appearance modules matched to the identified parts to estimate camera pose.

These and other features and advantages of the invention will be apparent to those skilled in the art from the following detailed description of preferred embodiments, taken together with the accompanying drawings, in which:

DETAILED DESCRIPTION OF THE INVENTION

To date, proposed AR systems presume the user/technician has the correct parts in-hand or they are readily accessible to perform the task. In many tasks, there may be many parts that are not readily known or identifiable to the novice or experienced user/technician. Furthermore, some tasks may involve tens to hundreds of parts that are dispersed, often with no organization, throughout the working environment, and that are used to perform different instructions to complete the task. A lot of time can be wasted identifying and locating the right parts and keeping track of the parts through the entire process.

As used herein, a "part" is a physical object. A representative but not exhaustive list of examples of parts include: a gear, motor, or other mechanical part of a machine, a tool to be used upon another part in the scene, a figurine in a diorama, a garment in an apparel marketing display, a cable or connector in a system assembly, inventoried merchandise in a warehouse order picking and fulfillment task, ingredients and cookware called for in a recipe, furniture and decorative elements that comprise a themed set, and other sets of physical objects that share a defined relationship.

For purposes of illustration and without loss of generality, the use of an AR system to perform a particular task of assembling an up-armor kit on an Interim High Mobility Engineer Excavator (IMHEE)—a militarized wheeled excavator construction vehicle will be described. In this example, a "part" may include a vehicle part, tool, subassemblies, equipment, machines or vehicles, for example, for assembling or dissembling the vehicle parts. It will be understood by those skilled in the art that the described AR approach is generally applicable to guide a user in the performance of any task that comprises the execution of a set of instructions requiring parts of any kind. One skilled in the art will understand that the AR approach will find applicability in military, industrial, manufacturing and other environments.

Figure 1A:
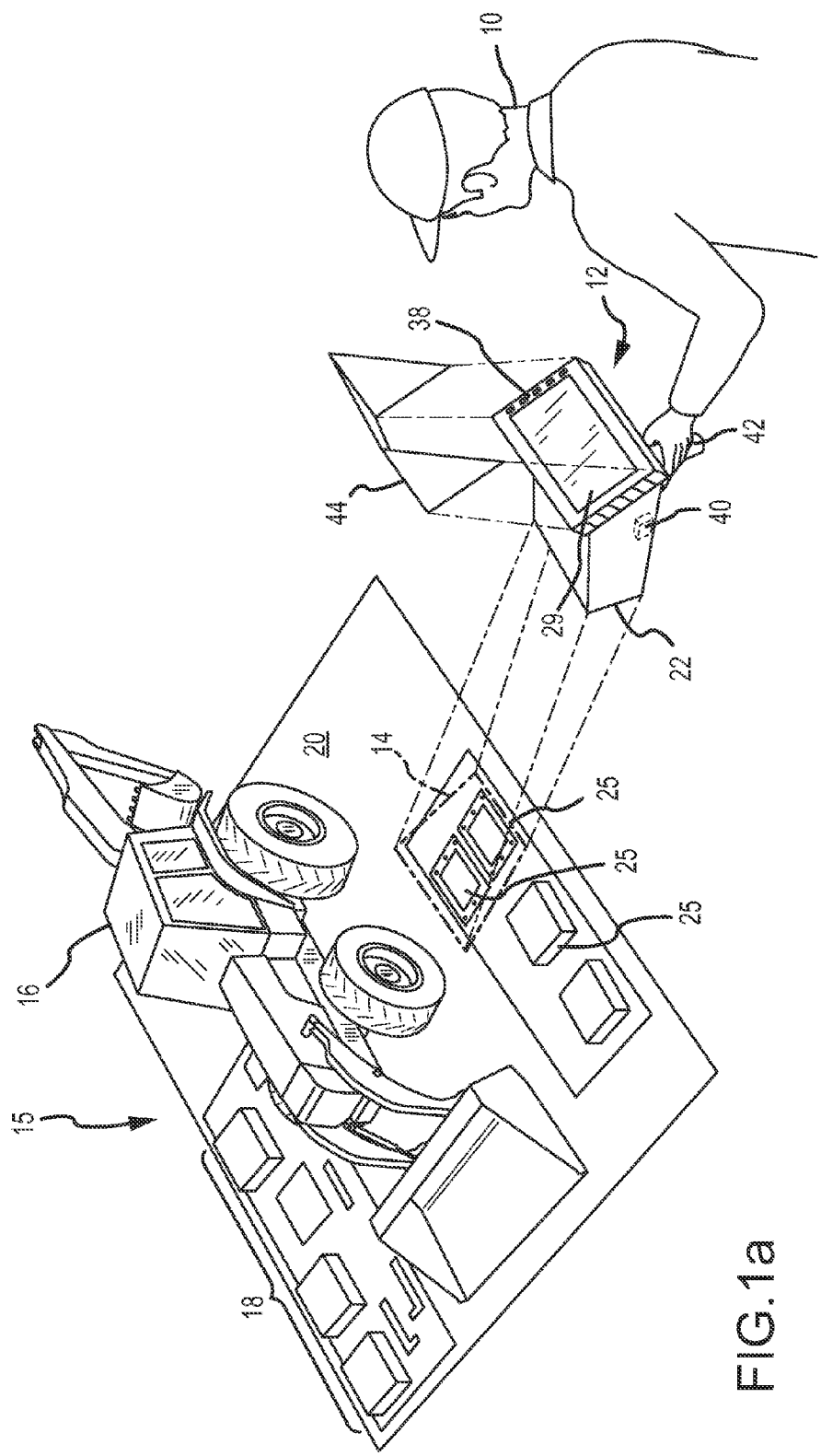
FIGS. 1a through 1c are a sequence of drawings depicting an AR system for tracking parts and rendering instructions to use those parts in accordance with the present invention.
Figure 1B:
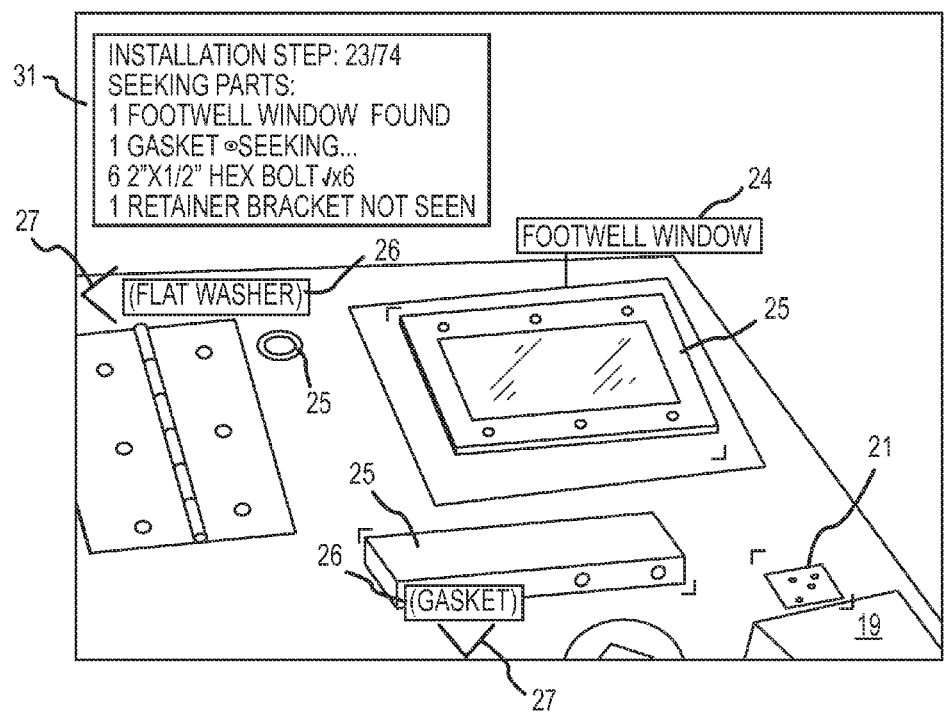
Figure 1C:
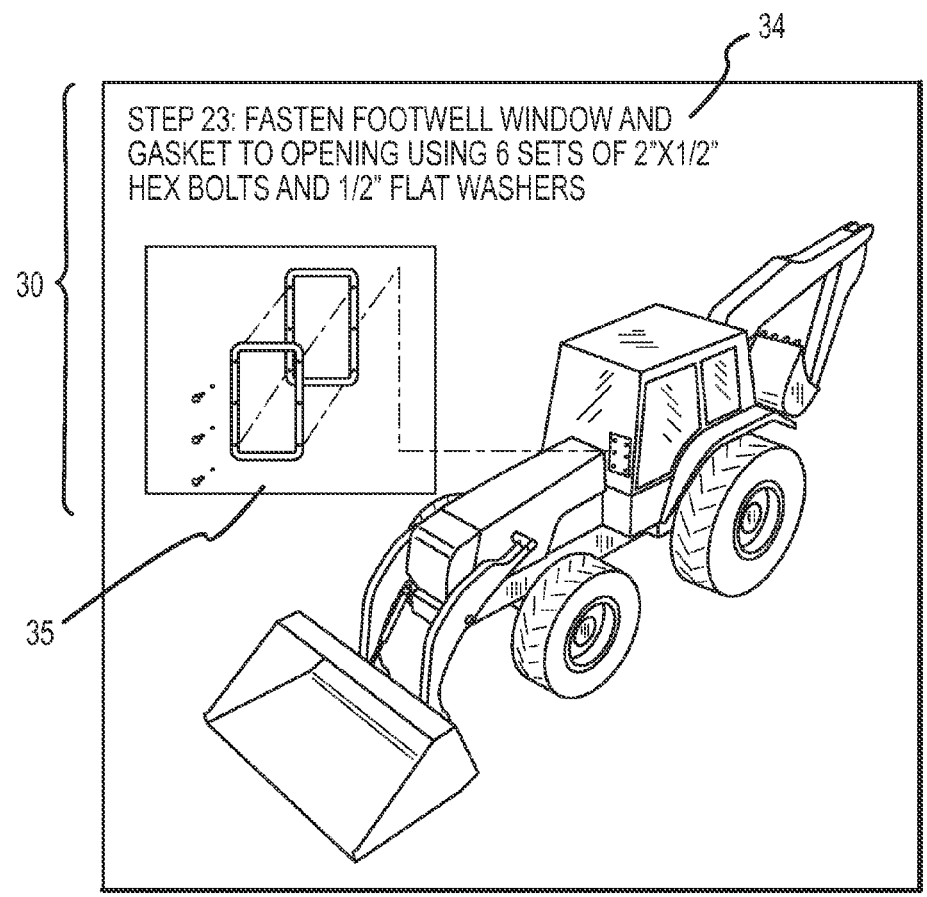

As shown in FIGS. 1a-1c of an embodiment, a user 10 uses a hand-held AR system 12 to scan a FOV 14 over a scene 15 including an IMHEE 16 and an up-armor kit of parts 18 laid out around the IMHEE in a FOR 20. Small parts such as flat washers or bolts are placed in separate bins 19 and provided with readily identifiable and unique fiducial marks 21. Hand-held AR system 12 includes a camera 22 that captures a video signal of images of the scene within FOV 14. The camera may capture images in any number of bands including visible and IR. The camera may be a LIDAR device. The system includes memory units that are loaded with templates of the parts and instructions to install the parts to up-armor the IMHEE. The system includes a computer that is programmed to execute instructions to process the video signal and stored templates and instructions to identify, locate and track the parts as the camera FOV scans the scene, to render icons 24 registered to parts 25 within the current FOV 14 and render icons 26 with location indicators 27 for parts outside the current FOV over the acquired images of the scene on a display 29 and to render the instructions 30 for the use of those parts on the display for each instruction. In this embodiment, display 29 is an opaque display on which the captured images are actively rendered.

The computer may also render the list 31 of parts for each instruction and any parts not yet identified along with the parts icons 24, 26. Identified parts within the current FOV are indicated as "Found", identified parts outside the current FOV are indicated as "Seeking", parts that have been retrieved are indicated with a "check", and parts that have not yet been identified are indicated as "Not Seen". The parts icons may be symbols assigned to specific parts or labels that identify the part to which they refer. The location indicators 27 may be one or more of the position of icon 26 on the display, a directional indicator such as an arrow or a distance to the part. The visually rendered instructions 30 may include text 34 describing how the parts are to be used or an illustration 35 of how the parts are to be used. The visually rendered instructions 30 may be overlaid on the scene imagery captured by the camera or a computer-generated model of the IMHEE. In the latter case, the model may be scaled down in size so that it fits on the display. The computer may in some cases render some or all of the instructions aurally.

Depending on the task, the user may scan the entire FOR, possibly from multiple different angles, to identify and locate all of the parts required for the task prior to initiating execution of the first instruction. This approach has the advantage of building a repository of the identities and location of all the parts a priori. Also, because the parts are scanned from multiple viewpoints, and all the parts in a closed list are identified and located, the confidence with which the parts are identified and located should be high. If a repository or inventory is built up-front, the AR system may direct and assist the user to re-arrange the parts around the vehicle for more efficient performance of the task and update the locations accordingly. Another approach is to initiate execution of the first instruction coincident with starting to scan the scene. In this case, the classifier builds the repository of parts' whereabouts as the user scans the scene to find any missing parts on the parts list for the current instruction. This approach has the advantage of not delaying performance of the task to build the repository of parts' whereabouts. With either approach, once a part is identified and located, it will not need to be reacquired as the part enters, departs and re-enters the FOV (provided the part is not re-positioned, removed or replaced while outside the FOV).

In this embodiment, the hand-held AR system 12 also comprises a user input device 38 such as a keypad or Graphical User Interface (GUI). The user may use the keypad or GUI for many purposes including selecting the task to be performed (e.g. the vehicle and kit), initiating the installation process, signifying to the computer that the user has acquired all of the parts and the system can move from parts rendering to instructions rendering, selecting the correct part from a plurality of candidate parts identified and rendered, identifying the rendered part as being the wrong part, signifying to the computer that the current instruction has been completed, requesting more detailed instructions for the current step and so forth. System 12 also includes an inertial sensor 40 such as provided by a number of gyros and accelerometers. The inertial sensor 40 may provide an estimate of camera motion to augment such estimates derived from the video signal to track the parts. The system may also comprise a pistol grip 42 to hold the unit and a glare shield 44 to shield the display.

Figure 2:
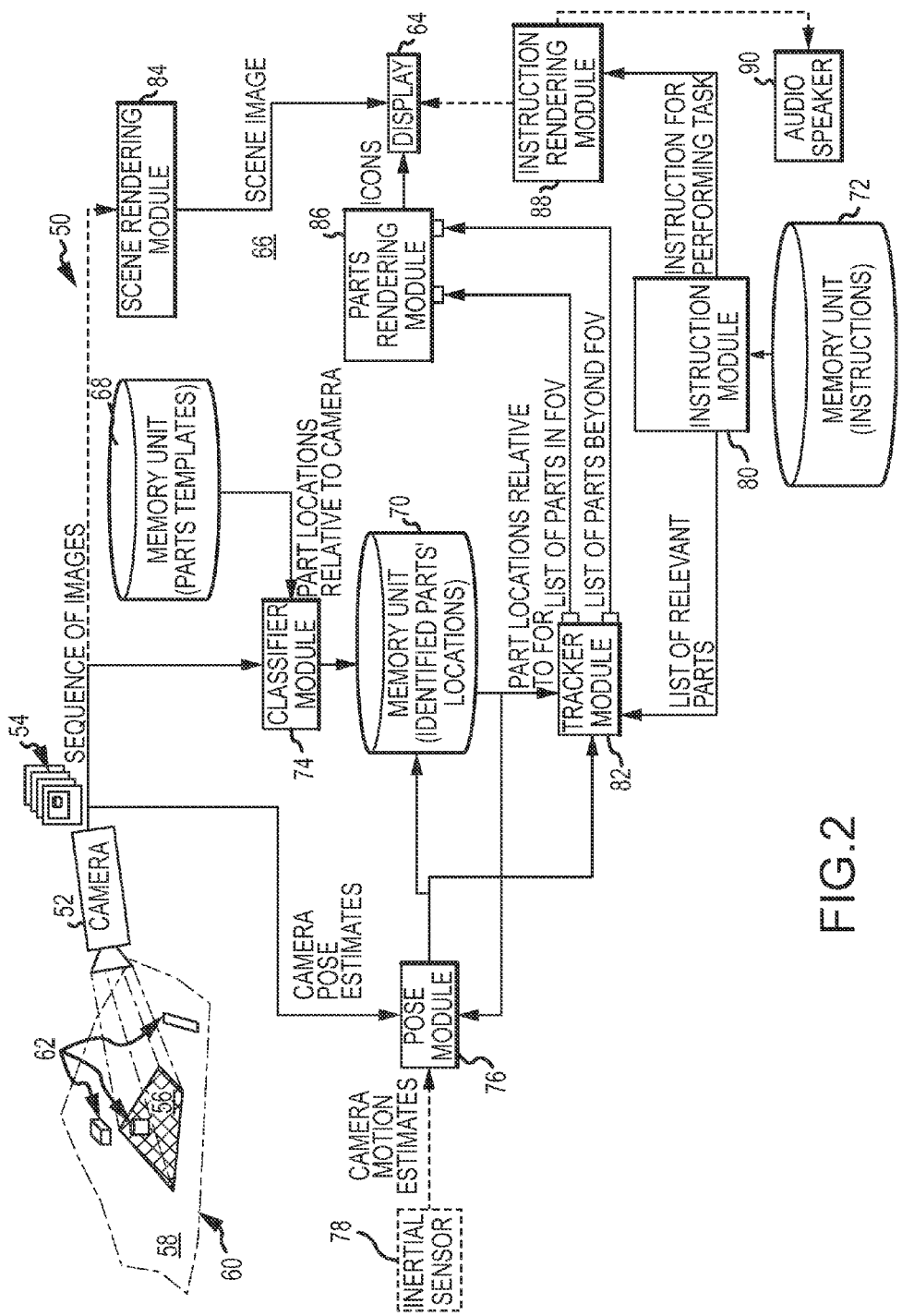
FIG. 2 is a block diagram of an AR system for tracking parts and rendering graphics for parts and instructions for the use of those parts.

As shown in FIG. 2, an embodiment of an AR system 50 comprises a camera 52 for recording images 54 within a FOV 56 over a larger FOR 58 in a scene 60 including parts 62, a display 64, a computer 66 and memory units 68, 70 and 72, which may or may not be physical separate memory. The hardware is suitably integrated in a hand-held or head-mounted unit. Templates for the parts are stored in memory unit 68. Templates may include specific fiducial marks provided on certain parts or points of interest in the scene, or feature sets or models of parts. Instructions including a list of parts for each instruction and instructions for the use of those parts are stored in memory unit 72.

Computer 66 is configured with a number of modules to track the parts and render computer-generated icons of the parts and instructions for their use. It is to be understood that the "computer" may be one or more computers, special purpose computing devices or general purpose computing devices configured with special purpose firmware or software. A classifier module 74 processes images 54 of the scene using the templates to locate and identify the parts 62 in the scene over the FOR and store the parts' identities and locations in the memory unit 70. A pose module 76 processes data such as the locations of identified parts or points of interest in the scene from images of the scene to estimate camera pose (coincident with user pose). The pose module may use the temporal behavior of the parts locations relative to the camera, or appearance models of the parts to estimate camera pose. The same type of data may be extracted for non-part features in the scene. An inertial sensor 78 on the camera may also provide data as to camera motion. The AR system and pose module are suitably "self-contained" in that only image data, and possibly camera motion provided by the inertial sensor on the camera, are used to estimate pose. The system does not need to rely on sensors that must be pre-positioned in the local scene or on global sensors such as GPS. A hybrid AR system could be configured to use such pre-positioned sensors if available.

An instruction module 80 retrieves the next instruction including the list of parts and the instructions for the use of the parts. For each instruction, a tracker module 82 determines from the estimated camera pose, the list of parts and the locations of those parts that lie within the current FOV and those parts that lie outside the current FOV. The tracker module may also determine if any listed parts have not yet been identified. A scene-rendering module 84 displays the image of the scene within the current FOV on the display 64. This module may actively display the images on an opaque hand-held or head-mounted display or passively display the images through a translucent head-mounted display. For each instruction, a parts rendering module 86 renders parts icons registered to parts within the current FOV and renders parts icons with location indicators for parts outside the current FOV over the displayed images of the scene. These location indicators may, for example, be the position of the part icon or a directional or distance indicator. The module may also render the list of parts and any parts not yet identified. An instruction-rendering module 88 renders the instructions for the use of those parts. The instructions may be rendered visually over the natural scene or a computer-generated model of the scene or aurally via an audio speaker 90. The instructions may comprise text or graphics of the part that illustrate the execution of the instruction.

Figure 3:
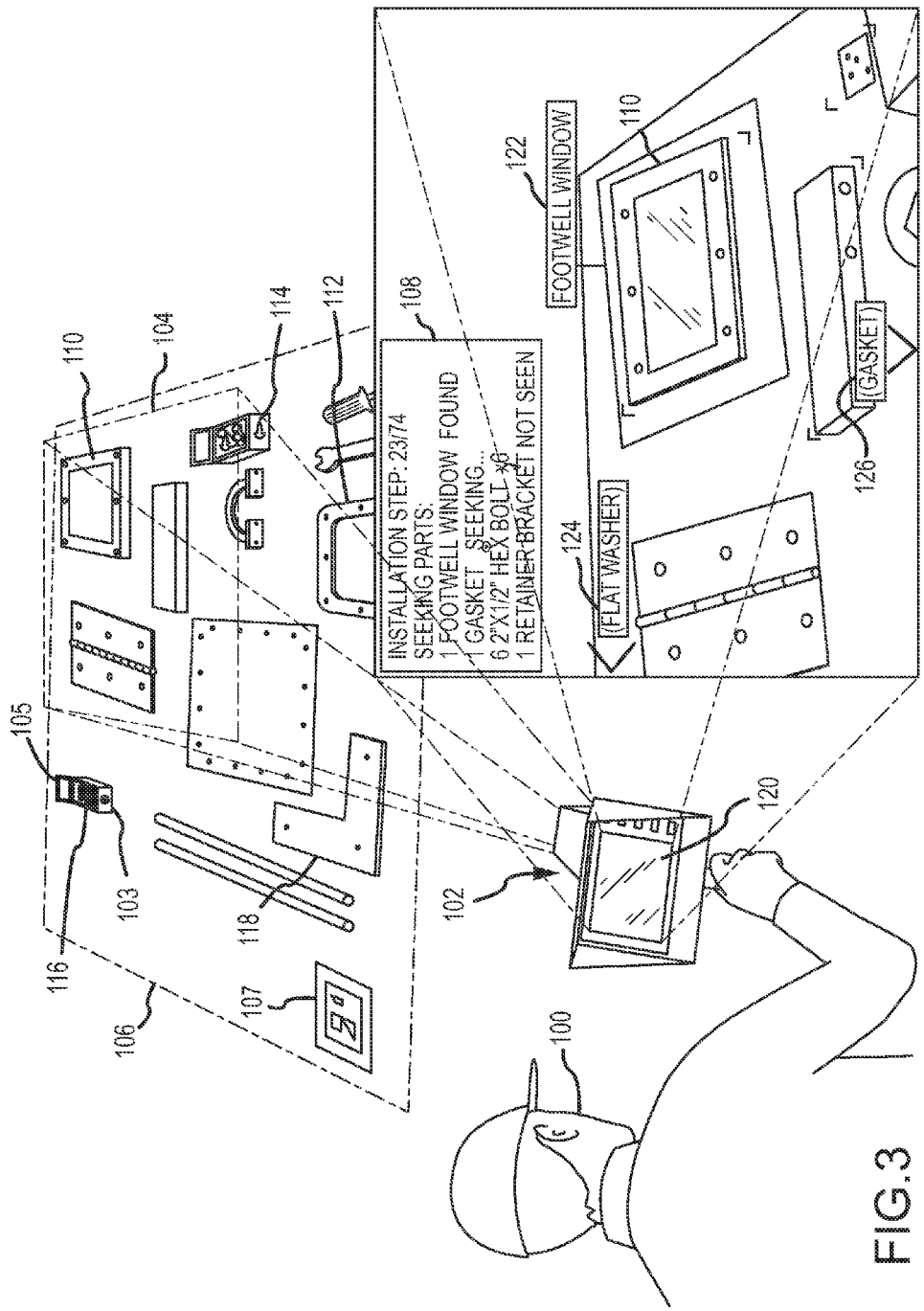
FIG. 3 is drawing illustrating a scene and the displayed portion of the scene including part icons registered to parts within the current FOV and positioned to indicate parts outside the current FOV.

An embodiment of the tracking and parts rendering aspects of the AR system are illustrated in FIG. 3. A user 100 uses a hand-held AR system 102 to scan a current FOV 104 of a portion of the FOR 106 over a scene including parts from an up-armor kit that are laid out on the ground. A bin 103 that stores flat washers is provided with a fiducial marker 105. Another fiducial marker 107 is fixed within the FOR to define a known point of reference. The current instruction provides a parts list 108 that lists a foot well window 110, a gasket 112, a hex bolt 114, a flat washer 116 and a retainer bracket 118. The AR system renders the images of the current FOV onto a display 120 and overlays computer-generated graphics of parts list 108, an icon 122 for the foot well window that is registered to foot well window 110, and icons 124 and 126 for the flat washer and gasket that are positioned on the left side and bottom of the display, respectively, and provided with arrows to indicate the respective locations of flat washer 116 and gasket 112 outside the current FOV. Consequently, once the user has acquired foot well window 110, he or she can quickly locate the flat washer and gasket. The AR system provides spatial cues to the user for parts needed to perform the current instruction that lie outside the user's current FOV. Tracking the location of parts throughout the process and rendering information as to their location outside the current FOV greatly improves the efficiency with which users can locate and identify the parts required for each step. In complicated tasks involving many steps and parts, tracking enhances the AR experience.

The displayed parts list shows a "check" by hex bolt 114, indicating that the user has already retrieved that part from the bin and input that into the system via a user interface (e.g. keypad, GUI, microphone, etc.). As the user retrieves parts and removes them from the scene, the classifier updates the stored identifications and locations. This information is used by the pose module to estimate camera pose and should be kept current. Furthermore, removing parts from the scene may affect the classification of other parts. For example, if there are two similar parts, the confidence with which the classifier identified each may be relatively low, but once one of them is removed the classification confidence of the other may increase. The system may not positively identify a part and put it in inventory unless the classification confidence exceeds a specified threshold. Alternately, the system may render multiple parts icons for a given part if there are multiple candidates in the scene that have similar confidence levels. The system may render the parts icons for different candidate objects differently according to a likelihood that the candidate object is the part. For example, the system could render the highest confidence in green, next in yellow and lowest in red. In both cases, updating the classifier as the instructions are performed and parts removed can improve classification and the information rendered to the user.

The displayed parts list also shows "Not Found" by listing of the retainer bracket 118 in the parts list 108. This means the classifier has not yet identified and located the retainer bracket. This may be because that portion of the FOR has not yet been scanned, or because the classifier couldn't identify the part with sufficient confidence to generate a positive classification. As the user scans the scene, the classifier is continually provided with new images from different poses. The classifier processes this information to verify and strengthen the identification and location of previously classified parts, or to identify and locate parts not previously identified to continuously build and update the inventory of parts.

Another possibility is that the classifier makes a mistake, identifies an object as a certain part that it is not, and renders an incorrect icon on the display. In this case, the user, having found the part and determined that it is the wrong part, may log the error into the system through the user interface. The classifier may either identify another object as that part immediately, or may identify the parts as "not found" until the user scans the correct part. The classifier may also attempt to properly classify the part the user selected and add its correct identity and location to the inventory.

Figure 4:
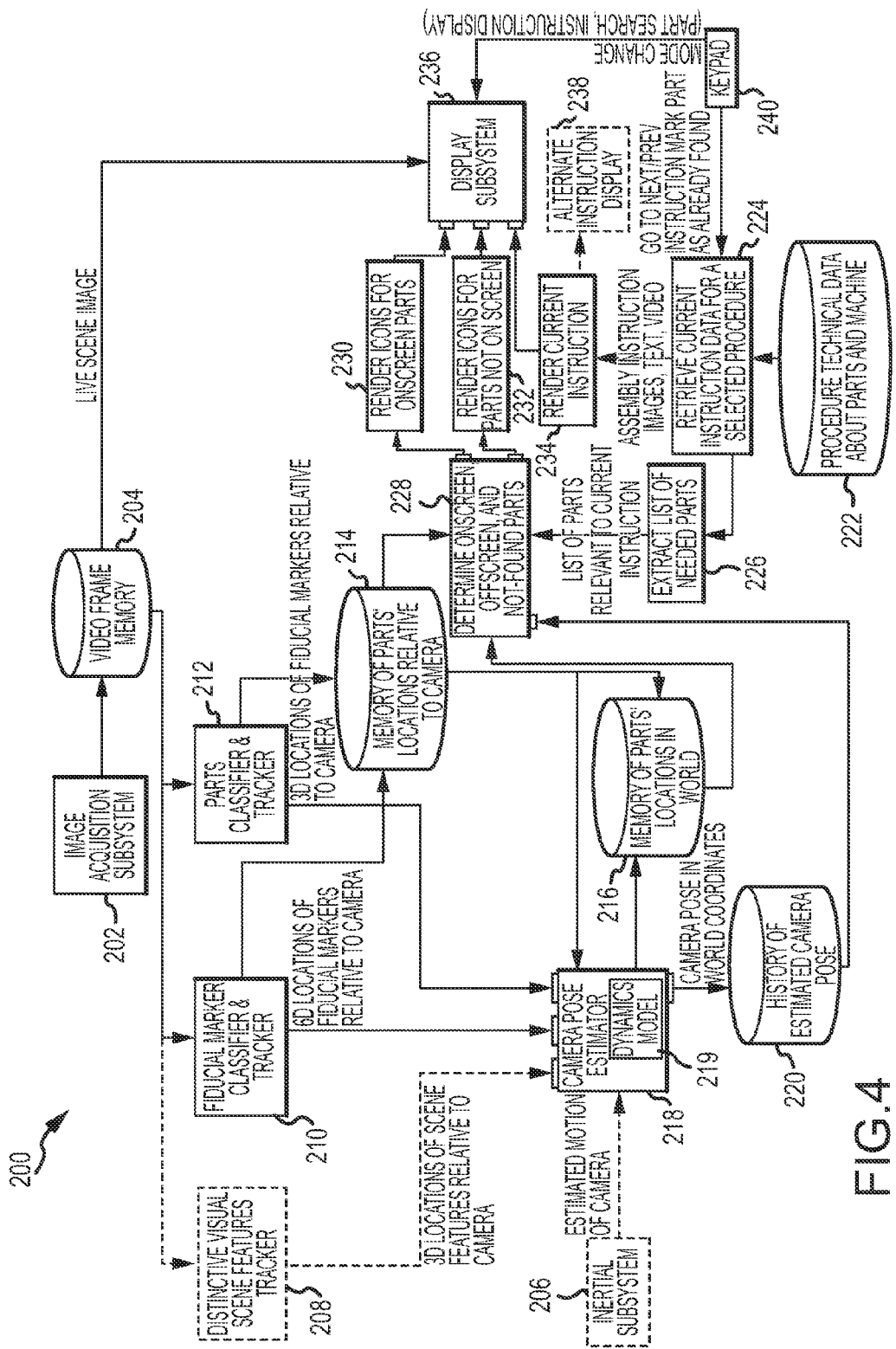
FIG. 4 is a diagram of an AR system including an embodiment of the classifier and camera pose estimator.

Another embodiment of an AR system 200 is illustrated in FIG. 4. In this embodiment, the classifier and pose modules interact to identify and locate parts and to estimate camera pose as the camera's FOV changes throughout the FOR. The classifier comprises a fiducial marker classifier and tracker 210 that detects fiducial markers on parts and provides the part's identity and location and a parts classifier and tracker 212 that uses the stored templates to detect parts and provides the part's identity and location. The classifiers may use the estimated camera pose to improve classification by, for example, orienting the appearance model for a part to the current pose. The pose module comprises at least two sources selected from the fiducial marker classifier 210 and parts classifier 212, a distinctive visual scene feature classifier 208 that identifies and locates points of interest in the scene and an inertial subsystem 206 that estimates camera motion. The fiducial marker classifier also identifies and locates fiducial marks placed on points of interest in the scene. A camera pose estimator 218 processes inputs from at least two and possibly all of these sources and generates the estimated camera pose. The camera pose estimator may use the temporal change of parts' locations or visual appearance modules matched to the identified parts to estimate camera pose. The camera pose estimator may apply different appearance models to the identified parts and scene features and evaluate the appearance evidence to generate the estimated camera pose.

AR system 200 comprises an arrangement of functional blocks, each block described by its function and input and output. Some of the functional blocks are described as algorithms, these algorithms are implemented as sequences of computer readable instructions that are stored in memory and executed by processing devices in the AR system. The algorithms may be provided as software that is used to configure the processing devices to provide a special-purpose computer for implementing the AR system, or implemented directly in hardware.

Image Acquisition Subsystem 202

Image Acquisition Subsystem 202 captures an image of the scene bounded by the Field of View and converts it to a digital bitmap representation. The subsystem may capture photons in the visible, IR or other bands. The subsystem may be a LIDAR system. The subsystem may also provide separation of the image into complementary color channels, compensation of lens optics distortions, quantization of the image spatially, temporally, and in intensity.

Video Frame Memory 204

Video Frame Memory 204 comprises a memory store (typically in RAM) of recent images. This store supplies image data to both the computer vision algorithms (Distinctive Visual Scene Features Tracker, Fiducial Marker Tracker, Known Parts Recognition & Tracking) and Display Subsystem. The store receives sequential digital images and outputs digital images, sequentially or randomly accessed Inertial Subsystem (Optional) 206

Inertial Subsystem 206 comprises a set of accelerometers or gyros that measure acceleration in 3 or 6 dimensions (X, Y, Z, Yaw/Pitch/Roll). The inertial subsystem is physically fixed to the Camera of the system, and the spatial relationship between the Camera's focal plane array and the origin of the inertial sensor is known by design or by measurement. Integrated with the sensor is a memory store that records the measurements made by the Inertial Sensor as a function of time, and an Integrator that integrates (in the mathematical sense) acceleration measurements vs. time to estimate velocity, and integrates velocity vs. time to estimate changes in position. However, due to noise or measurement errors in the Inertial Sensor, the Integrator's estimate of camera pose is subject to drift as a function of time, with the magnitude of error increasing according to the square of differential time. The subsystem outputs estimated changes to camera pose as a function of time.

Distinctive Visual Scene Features Tracker (Optional) 208

Tracker 208 implements a computer vision algorithm that inspects the current and recent images of the scene to find point or linear features that can be (1) consistently found again in adjacent and temporally near scene images and (2) appear to be fixed with respect to the FOR. Data about such features is computed and stored for some period of time, including its location in the image, and descriptions of its appearance (which may be an image template or other mathematical representations). The tracker outputs estimated 3D Locations of Distinctive Scene Features relative to the Camera. The SIFT algorithm can be used to implement this function. The tracker may contain an integrated SLAM or SLAM-like algorithm that infers the ego-motion of the camera by analyzing the apparent motion of scene features over time. Alternatively, the output of this block may feed into a shared SLAM or SLAM-like algorithm that accepts inputs from multiple trackers.

Fiducial Marker Classifier & Tracker 210

Tracker 210 implements a computer vision algorithm processes digital images of the scene in which fiducial markers are visible to detect, locate, and uniquely identify patterns (Fiducial Markers) specifically placed upon Parts or fixed portions of the FOR. The spatial relationship between a given Fiducial Marker and Part to which it is affixed (or to the FOR if it is fixed to the FOR) is known a priori. A commonly used fiducial marker is a square black ring on a white background, which encompasses a unique identifier pattern. The unique identifier pattern could be a symbol, such as a letter, number, or icon, or it could be an arrangement of smaller pre-defined shapes (squares, triangles, circles, concentric rings) that comprise a binary bit code. A 2D bar code is one embodiment of an identifier pattern. The size (length) of the fiducial marker is also known a priori. Because its shape and size are known, perspective distortions of the fiducial marker in the current scene image are used to deduce the 6D pose of the Camera with respect to the fiducial marker, or the 6D pose of the marker with respect to the Camera. The locations of detected fiducial markers in the scene may be stored, and used at a future time to accelerate the search for fiducial markers in a subsequent image. The tracker outputs (1) estimated changes to Camera pose as a function of time and (2) estimated 6D positions of fiducial markers (and implicitly, Parts to which they are affixed) as a function of time. The publicly available ARToolKit software library implements a Fiducial Marker Tracker.

Parts Classifier & Tracker 212

Tracker 212 implements computer vision algorithms and image processing techniques to gather and store calibration data for a set of defined Parts that describes characteristic features of the Parts when imaged by a camera. A simple example would be image templates that store the outline shape of each part from a multitude of poses, where each such image template is recorded with the relative pose of the Part with respect to the Camera when the template was generated. A more complicated implementation would use the well known SIFT feature tracker to analyze characteristic features of the parts.

The tracker implements a computer vision algorithm that utilizes provided prior information about Parts' appearances and performs analysis on live and recent images of the scene, to detect locate, and identify any of the defined Parts in the FOV. The algorithm may include features to compensate for variations in lighting, slight differences in the current pose of a Part vs. its pose when an approximately matching Template was created, and rotation of the Part in the scene.

Having found the location of defined Parts in the FOV, the tracker attempts to estimate the 3D locations of the Parts w/r ("with respect") to the Camera. Examples of implementation include: using knowledge of the Parts' physical size vs. image size to estimate range, assuming that all Parts are situated at ground level, and estimating the location of the ground plane that would best fit this assumption. The tracker outputs estimated 3D positions of Parts (relative to the Camera) as a function of time. The SIFT (Scale-Invariant Feature Transform) algorithm can be used to implement this function. Other object recognition algorithms may be used as well.

Memory of Parts' Locations Relative to Camera 214

Memory 214 stores sequential observations of 3D or 6D positions of parts as reported by the Fiducial Marker Tracker and the Parts Classifier & Tracker.

Memory of Parts' Locations in World 216

Memory 216 stores sequential observations of 3D or 6D positions from the Memory of Parts' Locations Relative to Camera and sequential estimates of Camera Pose in World coordinates. The memory transforms the camera-relative positions of Part's locations into World-relative (or FOR-relative) coordinates, and stores or updates the World-relative locations of parts in memory.

Camera Pose Estimator 218

Camera Pose Estimator 218 processes (a,b,c) time-sequential observations of features (e.g. Parts or SIFT scene features) and their locations in the current scene image, and (d) estimated camera motion from the Inertial Subsystem to provide an estimate of Camera pose in World or FOR coordinates. The Estimator determines the correspondence of features between sequential images of the scene, encompasses a model of the relationship between 2D image locations and 3D spatial locations, and infers the relative position and motion of (a) the observer (Camera) with respect to the features and (b) the features with respect to the observer. The Estimator also attempts to discriminate between features that are fixed with respect to the FOR and features that are moving with respect to the FOR.

The Estimator can accept error-prone time sequential observations of the features' positions relative to the Camera from one or more observing sources, and reconcile those estimations using certain control parameters, to provide an optimal estimate of the true Camera and features' pose and motion. For example, when the Camera's pose is estimated based on observation of a Fiducial Marker that is fixed to the FOR, this input can be given higher weight (or trust) to update the estimated position of the Camera. With lower weight (or trust), pose/movement calculations can be based on the detected locations of Parts with respect to the Camera. If available, Camera-relative feature positions' calculations from the Distinctive Visual Scene Features Tracker functional block can also be used to estimate the camera's relative change in pose from previous observations. Finally, under conditions of high speed motion for short periods of time, it may be the case that none of the computer vision methods can provide a confident estimate of camera pose or movement, but the Inertial Subsystem would provide relatively reliable estimates of changes in Camera pose under these conditions, and so is given higher weight when higher accelerations are measured.

The Estimator suitably contains a Dynamics Model 219 describing constraints on the possible dynamic motion of the camera. For instance, translational or rotational inertia and maximum velocities and accelerations may be defined, and can be used to help discriminate noise or jitter on the input signals from true movement.

In cases where the Estimator is implemented without the optional Distinctive Visual Scene Features Tracker, the Estimator can use fiducial markers affixed to the World (or FOR) to infer camera pose in World or FOR coordinates. In cases where there are no fiducial markers affixed to the World (or FOR), this block can define the initial position of the camera (upon system startup) as the origin of the World (or FOR).

The Estimator may be implemented using the Simultaneous Localization and Mapping (SLAM) approach. A Kalman filter or Particle Filter may be used to implement the Dynamics Model. See Maybeck, Peter S. 1979. Stochastic Models, Estimation, and Control, Volume 1, Academic Press, Inc. Greg Welch and Gary Bishop (1995). An Introduction to the Kalman Filter, University of North Carolina at Chapel Hill, Department of Computer Science, Chapel Hill, N.C., USA. TR95-041.

The Estimator may be combined with the Memory of Parts' Locations Relative to Camera block and/or the Memory of Parts' Locations In World block. The Dynamics Model may utilize assumption of zero long-term average translational velocity when the system is operated within a bounded FOR.

History of Estimated Camera Pose 220

Time-Sequential estimates of Camera pose form history 220. A memory contains the estimated pose (X/Y/Z, Yaw/Pitch/Roll) of the Camera with respect to the FOR, as a function of time. The current estimated camera pose is utilized by downstream functional blocks to relate observed positions of Parts to the FOR coordinate system, and to guide the rendering of computer graphics so that they will appear to be located at intended coordinates in the FOR.

Procedure Technical Data about Parts and Machine 222

Technical data 222 intended for direct or indirect presentation to the end user is stored in a data store (database). The data may include text instructions, pre-recorded images, a list of Parts, metadata referencing locations or directions with respect to Parts, sound effects, image sequences, and any other form of data that are specific to the Parts and procedure being performed, and enable the downstream functional blocks to correctly render the graphical display content needed by the end user.

Retrieve Instruction Data for Current Step of Current Procedure 224

Procedure 224 retrieves the currently applicable instruction from among a multitude of instructions held in the Procedure Technical Data About Parts and Machine block.

In an application where sequential instructions for performing a task are being shown, this procedure retrieves the data relevant to the current step of the procedure from a data store. The keypad can be used to signal this block to increment or decrement the current step.

Extract List of Needed Parts 226

From the retrieved data pertinent to the current instruction for which guidance is being presented to the end user, this functional block extracts the list of Parts or objects that are required for (or relevant) the instruction. This list of Parts will typically be a subset of the list of all Parts defined by the system.

Determine Onscreen, Off-Screen, and Not-Found Parts 228

Functional block 228 receives (a) a list of parts relevant to the current instruction, (b) locations of Parts relative to the World or FOR, (c) locations of Parts currently visible to the camera, relative to the camera (d) estimated pose of Camera relative to the World or FOR. Given a list of all Parts relevant to the current instruction of the current procedure, this functional block determines which parts are currently within the camera FOV, which parts are within the Memory of Part Locations in the World but outside Camera FOV, and which Parts are not within the Memory of Part Locations In World. The block outputs (a) a list and locations of parts in FOV, relative to the Camera, (b1) a list of parts outside FOV, with (b2) locations of such parts relative to Camera, if found in FOR Render Icons for Onscreen Parts 230

A rendering application receives a list and locations of Parts in FOV relative to the Camera. The application renders time sequential overlay graphics that register to the location of the Parts in the live scene image. Graphics may take the form of point icons, outline bounding boxes or reticles, outline wireframe representations, area silhouettes of Parts, or other annotative visual representations.

Render Icons for Parts Not On Screen 232

A rendering application receives (a) a list of parts outside FOV and (b) locations of the parts, relative to the Camera, if found in FOR. The application renders time sequential overlay graphics that indicate the presence or absence of parts in the FOR. When locations of parts in the FOR are known, additional indicators showing distance and/or direction to the part, relative to the Camera, may be rendered. For Example, a directional arrow may be drawn at the edge of the overlay graphic that indicates the relative direction that the Camera should be turned in order to bring the FOV over the referenced part. Furthermore, a numeric text indicator may show the proximity of the Part to the Camera's current position.

Render Current Instruction 234

A rendering application receives instruction content for presentation to the user. The application renders instructions that indicate how Parts should be manipulated to affect the current task. Instructions may depict an action, illustrate an assembly/disassembly relationship, present a request for user input, or other indications that are relevant to performing the user's intended task. The application may render scene overlay graphic images, but alternatively, auditory or haptic information. For example, (a) a schematic depicting the assembly of Parts relevant to the current instruction may be shown, (b) a checklist of Parts to be gathered may be presented, along with indications of the current status of each such part (e.g. not-seen, found, seeking, gathered), (c) a single instruction indicating an action and the relevant location in the FOV may be rendered or (d) a question or measurement parameter may be presented to the user for response, with the user's response determining which instruction would be presented next Display Subsystem 236

Display Subsystem 236 presents information visually (and possibly aurally) to the user. The subsystem receives inputs from the keypad, one or more scene overlay graphic images from the various rendering applications, and Live Scene images. The subsystem displays combined imagery that overlays Icons for parts upon the live scene image, possibly in combination with overlays that provide instruction to the user. Keypad inputs can select which mode of information presentation is shown. The live scene image is presented electronically or via optical pass through. One or more graphical layers are overlaid on the live scene image. Some or all graphical layers are registered such that their graphical elements appear to the user to align with real physical objects observed in the scene. For example, Part searching assistance or Part installation instructions may be overlaid on the scene. Part installation instructions may be shown as text and graphics, and may be registered on the locations of the referenced parts in the FOR, if their location is known. Only those parts that are relevant to the current instruction that guidance is being provided might be graphically annotated. Other known or identified parts that are not currently relevant may not be annotated in the display, or may be annotated in a less obtrusive manner.

Alternate Instruction Display 238

This optional display represents an alternative approach of presenting an instruction to the user. For instance, the instruction may be verbal or auditory and presented via loudspeakers or headphones instead of being presented visually. Or, the instructions might be presented visually on a separate physical display from the one that presents live scene imagery to the user.

Keypad 240

Keypad 240 comprises a tactile input device, such as an array of momentary contact switches. The end user depresses certain buttons or switches on the keypad in order to signal commands such as (a) to change to a different display mode, or (b) to show a subsequent or preceding instruction in a sequential set of instructions being displayed.

Simultaneous Localization and Mapping (SLAM)

Figure 5:
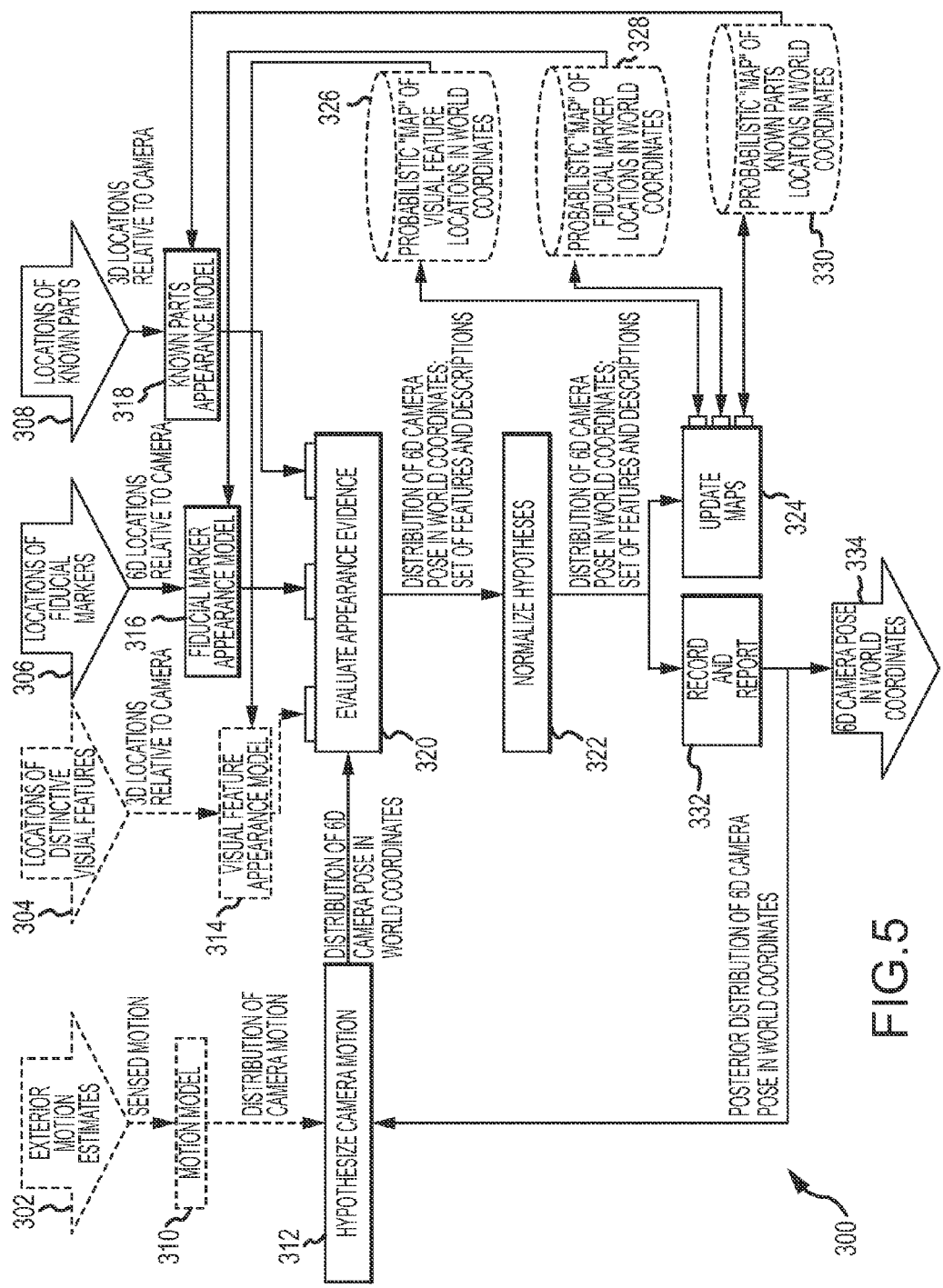
FIG. 5 is a diagram of an embodiment of the camera pose estimator based on Simultaneous Localization and Mapping (SLAM)

An embodiment of the Simultaneous Localization and Mapping (SLAM) algorithm 300 for implementing the camera pose estimator 218 is illustrated in FIG. 5. The SLAM algorithm is implemented as computer instructions in one or more computers.

Exterior Motion Estimates 302

This exterior motion estimate 302 is assumed to be from either an internal sensor, such as an IMU, an external positioning system, such as GPS, or a combination of the two. The input will be in the form of incremental motion estimates since the last time step. This input is purely optional, and is solely used to refine existing estimates.

Locations of "X" Features 304, 306 and 308

FIG. 5 illustrates three types of observational features: Distinctive Visual Features 304, Fiducial Markers 306, and Known Parts 308. A modified system could feasibly contain additional observational features, supplying the same role. The system only requires input from one of these three sources at a time, though it is capable of taking advantage of all sources at the same time. The input is assumed to provide information about the bearing of the features with respect to the current camera pose, though additional information such as range or orientation of the marker can be exploited.

Motion Model 310

Motion Model 310 receives exterior motion estimates, in some consistent format, representing the change since the last time step. Data may be anything from a single dimension of motion, to observed forces on the sensor, to full 6D position differentials. The motion model translates the information provided into a motion estimate for the camera system, using an internal model of how the Exterior Motion Estimates relate to camera motion. Note that this component is not necessary if the external motion sensor is not available. The motion model outputs a full 6D estimate of the incremental motion of the camera system since the last time step. If supported by the type of motion sensor, the component will also output uncertainty estimates in each dimension of motion Hypothesize Camera Motion 312

The posterior distribution of 6D camera pose in world coordinates from the last time step, and optionally the 6D distribution of camera motion from the Motion Model, are processed to hypothesize camera motion. This component represents the start of a new time step for the SLAM process. The previous estimate of the camera's pose is updated to account for possible motion since the last time step. This can be guided by the optional Motion Model component 310, or can rely solely on the previously observed motion to perform a "dead reckoning" of where the camera could now be located in 6D space (x, y, z, roll, pitch, yaw). This step will generally increase the uncertainty of the camera's pose. To draw an analogy to the well-known Kalman Filter, this component fulfills the same basic role as the time update equation. A distribution over 6D camera coordinates in world space, representing the a priori distribution of where the camera could be at this time, is provided as the output.

"X" Appearance Model 314, 316 and 318

Each appearance model receives a set of features of the "X" type. Each feature contains a descriptor, and some estimate of the feature location with respect to the camera.

There are three Appearance Model blocks 314, 316 and 318, each one corresponding to a different one of the "X" Feature inputs 304, 306 and 308. All three Appearance Models serve the same purpose of translating information from their corresponding input features into useable information by the core SLAM process. This typically consists of a remapping function from one set of coordinates and uncertainties into a 6D coordinate system with the camera at the origin, using the same units as the world coordinate system. The system also compares the feature descriptions to the set of previously observed features of that type, and compares descriptors to identify data associations from the observation to the "map". If the feature has been observed by the SLAM system before, this information is taken into account and included in the output. Naturally, these components are optional in the same sense that the "X" feature is also optional. Each appearance model outputs a distribution over 6D pose for each input feature, in camera-centric coordinates, including uncertainty in each dimension. The output may also include the prior estimate of the feature pose in 6D world coordinates, if this information is available.

Evaluate Appearance Evidence 320

A set of features currently observed in the field of view of the camera system is provided as inputs. Each feature includes a 6D pose distribution in camera-centric coordinates accounting for uncertainties from observation, as well as a unique description of the feature. The input may also include a prior estimate of the feature pose, as derived from the internal maps, if the feature has been previously observed. Features that are only identified in 'bearings-only' coordinates are still expected to be expressed in 6D coordinates, with a distribution indicative of an unknown range to the feature. The a priori distribution of 6D camera pose in world coordinates, after estimating the continued motion of the sensor system, may also be provided as an input.

This component refines the camera pose estimates calculated from the Hypothesize Camera Motion component according to how well the points in the a priori distribution fit the observed evidence when compared to the internal maps. Each combination of 6D camera pose and feature maps provides an expectation of what should been seen and where it should be located, relative to the camera. The observed evidence from the Appearance Models is then used to compute the probability of the observation, given each assumed pose. This process typically refines the distribution of the camera pose, using the observations to restrict which motions were plausible. To draw an analogy to the well-known Kalman Filter, this component fulfills the same basic role as the measurement update equation. This component outputs a distribution over 6D camera coordinates in world space, representing the a posteriori distribution of where the camera is thought to be at this time step. Also output is the set of features and their descriptions, as fed in as input, to be used when updating the maps.

Normalize Hypotheses 322

A distribution over 6D camera coordinates in world space, representing the a posteriori distribution of where the camera is thought to be at this time step is provided as an input. The set of features currently observed and their descriptions, to be used when updating the maps may be inputs. The output from the Evaluate Appearance Evidence component 320 is often a set of un-normalized likelihoods, depending on the tracking algorithm implemented. These likelihoods are renormalized to ensure that the distribution is a proper probability distribution, and effectively dividing by the unconditioned probability of observation. In the case of a sample-based tracker (e.g. particle filter), this step would also perform the resampling step. This component outputs a distribution over 6D camera coordinates in world space, representing the a posteriori distribution of where the camera is thought to be at this time step. Also output is the set of features and their descriptions, as fed in as input, to be used when updating the maps.

Update Maps 324

A distribution over 6D camera coordinates in world space, representing the a posteriori distribution of where the camera is thought to be at this time step is provided as an input. Also, the set of features currently observed and their descriptions may be input.

This component records the observations of features into 6D probabilistic map 326 (visual feature), 328 (fiducial marker) and 330 (known parts) in world coordinates. New features are added into the map as new entries. Features with previous entries associated to them from the Appearance Models are providing refinements to the feature location. The uncertainty in the feature location and the pose of the camera is reflected in the probabilistic nature of the map. Note that each type of feature maintains its own separate map. Correlations between the map uncertainty and the camera pose uncertainty are also modeled. This component outputs an updated 6D feature pose in world coordinates for each feature observed at this time.

Record and Report 332

A distribution over 6D camera coordinates in world space, representing the a posteriori distribution of where the camera is thought to be at this time step is provided as an input. The component records the distribution of the camera trajectory, and any other information that may be relevant to internal models or external demands. This includes any information that is needed to update the typical motion expression about the camera (e.g. typical and maximum velocities or accelerations) or noise models. This is the final step in the SLAM process for a given time step. The component outputs a distribution over 6D camera coordinates in world space, representing the a posteriori distribution of where the camera is thought to be at this time step. In other words, a 6D camera pose in world coordinates 334. This pose is not a single pose but a distribution of what the pose could be. A single most likely pose value is reported to the rest of the system but internally the SLAM maintains a full distribution of poses.

Figure 6:
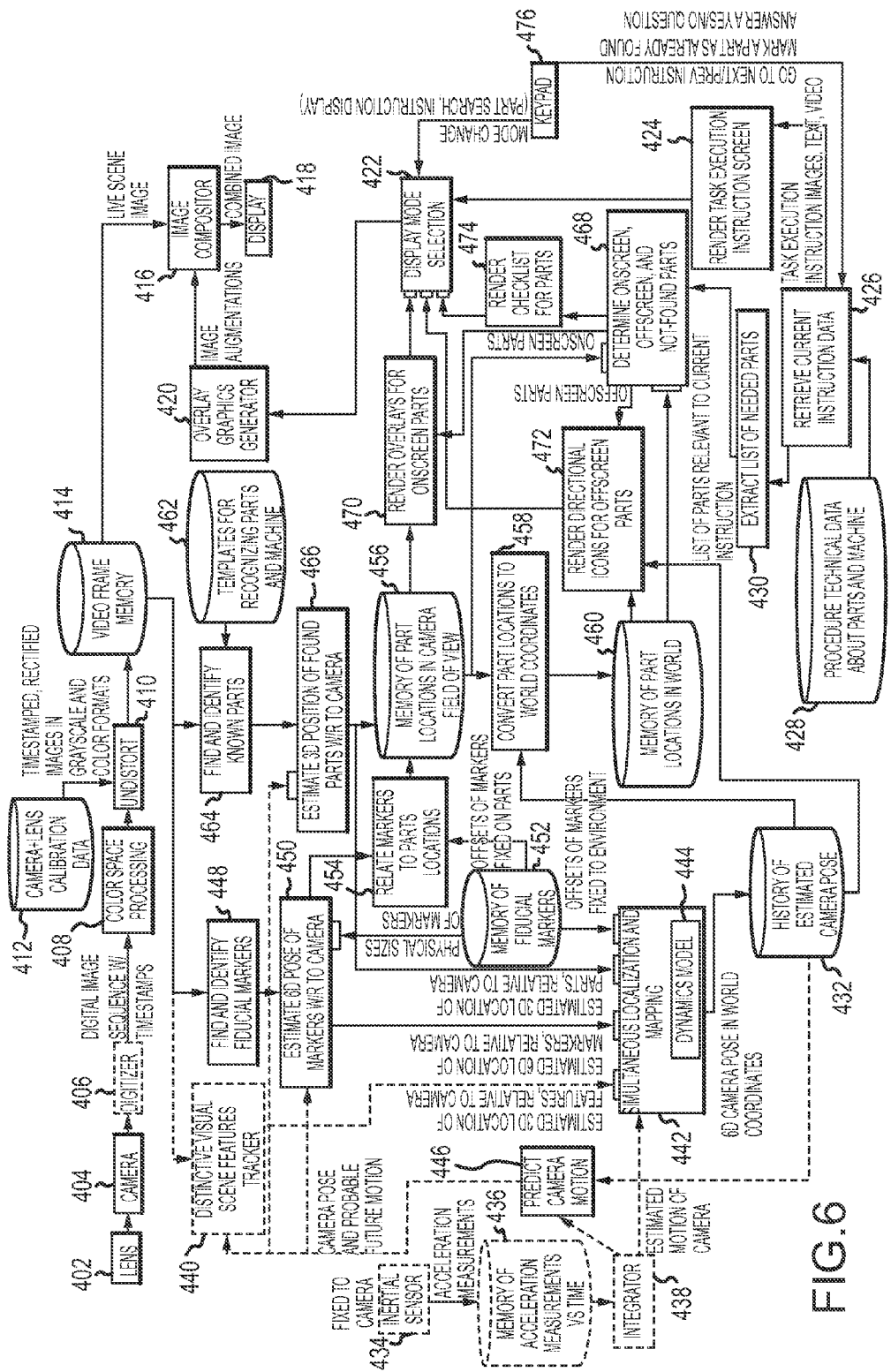
FIG. 6 is a detailed embodiment of an AR system.

Another embodiment of an AR system 400 is illustrated in FIG. 6. AR system 400 comprises an arrangement of functional blocks, each block described by its function and input and output. Some of the functional blocks are described as algorithms, these algorithms are implemented as a sequence of computer readable instructions that are stored in memory and executed by processing devices in the AR system. The algorithms may be provided as software that is used to configure the processing devices to provide a special-purpose computer for implementing the AR system or implemented directly in hardware.

Lens 402

Lens 402 focuses the scene image in front of the Camera onto the Camera's focal plane array. The lens may comprise a typical lens used on industrial or machine vision cameras. It may be spherical. It may be made of glass or plastic materials. It may be a pinhole lens to improve depth of field (ability to focus across a range of distances). Ideally it provides the widest possible field of view while limiting distortion (e.g. barrel distortion).

Camera 404

Camera 404 collects photons that have passed through the lens onto a focal plane array, and outputs an analog raster image or a digital bitmap image at a rate that is typically at least 30 images/sec. Faster rates are beneficial. Higher resolution focal plane arrays are desirable, but 640×480 resolution is common. The image may be gray scale, but is typically preferred to be color for presentation of images to the user. The camera may be integrated with the digitizer block.

Digitizer 406

Digitizer 406 receives an analog electrical signal from the camera comprising a sequence of raster images, quantizes the signal intensity vs. time and outputs the time sequential readings in a 2D array of intensity values that comprise a digital image. The digitizer typically has a digital interface (e.g. PCI, PCIe, USB, CameraLink, etc.) to a memory buffer on the computer or device that implements color space processing. The temporal separation of output images is either known and fixed, or otherwise measured and attached as metadata with each image.

Color Space Processing 408

This block converts the digital image in camera-native pixel format from the digitizer into pixel formats that are suitable for computer vision algorithms and graphical displays. The block may convert from YUV pixel format to RGB. It may also make gray scale (luminance) copies of the image for use by computer vision algorithms that work on intensity only.

Undistort 410

This block uses the camera and lens calibration data to process the digital image having a pixel layout as captured by the Camera to correct for lens distortion. In practice, most lens systems create spatial distortion, such as barrel distortion. This has the effect of making features that are spaced at constant intervals in the physical world appear to be spaced at non-linearly-varying intervals in the camera image. A "fisheye" effect is sometimes noticeable to a human observer. Using pre-recorded calibration data specific to the camera+lens configuration, the image is spatially warped in a nonlinear way by this block to compensate for the inherent distortion of the lens system.

Camera+Lens Calibration Data 412

Camera and lens calibration data is pre-loaded into memory. By imaging grid patterns or other fiducial patterns in a controlled environment, a set of calibration data can be gathered that quantify the distortion of the lens+camera system. These data can be used by the undistort algorithms to undistort an image captured using that lens+camera system.

Video Frame Memory 414

Video Frame Memory 414 comprises a memory store (typically in RAM) of recent images. This store supplies image data to both the computer vision algorithms and the underlying image of the Image Compositor.

Image Compositor 416

Image Compositor 416 accepts an underlying image, typically of the scene viewed by the camera (or scene optically passed through a translucent display) and an overlay image, typically consisting of computer generated graphics, and combines them. The output is sent to the physical display device.

Display 418

Display 418 displays an Augmented Scene Image for viewing by the user. The end-user views the combined augmented reality image over live imagery of the scene using this device. Common embodiments include head-mounted display or LCD flat screen.

Overlay Graphics Generator 420

The generator receives metadata describing the composition of synthetic or recorded imagery and outputs an overlay graphics image. The generator generates (a) synthetic graphics (possibly including 2D and 3D vector and raster images and text) in such a way that certain icons or symbology will register upon their corresponding features in the scene image when combined with the scene image by the Image Compositor or (b) synthetic graphics that need not align with features of the scene image Display Mode Selection 422

This block receives as inputs (a) a keypad signal, (b) a graphical instruction for task execution or (c) one or more graphical overlay(s) for a part seeking/gathering activity and outputs a selected set of graphics. The block selects from among one or more available sets of graphics that could be presented to the user, depending on the current context, situation, and the user's selected mode of display (signaled through the Keypad). Examples of display modes could be: (a) showing assembly instruction in a virtual 3D environment in which the scene is rendered as computer-generated graphics and the parts and instructions are rendered over the graphics, (b) showing assembly instructions as graphical augmentation of a live view of the scene, (c) showing the current locations of identified parts in the scene, (d) showing a list of parts (and the status of each part) needed at the current step of a procedure, (e) showing the relative direction of parts that are needed at the current step of a procedure, or (f) some combination of modes a-f.

Keypad 476

Keypad 476 comprises a tactile input device, such as an array of momentary contact switches. The end user depresses certain buttons or switches on the keypad in order to signal commands. The keypad may be used to signal user input (a) To change to a different display mode, or (b) to show a subsequent or preceding instruction in a sequential set of instructions being displayed or (c) to answer affirmatively or negatively to a presented question.

Render Task Execution Instruction Screen 424

This block receives instruction data for presentation to the user and outputs a graphical rendering of instructions. Given a set of instructional data to be presented to the end user, pertaining to how the task of a procedure should be executed, this functional block combines those data (which may consist of text, pre-recorded images, or pre-recorded video) into a graphical image or image sequence.

Retrieve Current Instruction Data 426

This block receives a keypad signal or other signal for selection of instruction and a plurality of instructions from a memory store and outputs instruction data. The block selects an instruction from the plurality of instructions available and routes the instruction data to any functional blocks attached to the output. In an application where sequential instructions for performing a task are being shown, this functional block retrieves the data relevant to the current step of the procedure from a data store. The keypad can be used to signal this block to increment or decrement the current step.

Procedure Technical Data About Parts and Machine 428

This block is a data store (database) that contains technical data comprising a plurality of instructions intended for direct or indirect presentation to the end user. It may include text instructions, pre-recorded images, a list of Parts, metadata referencing locations or directions with respect to parts, sound effects, image sequences, and any other form of data that are specific to the parts and procedure being performed, and enable the downstream functional blocks to correctly render the graphical display content needed by the end user.

Extract List of Needed Parts 430

From the retrieved data pertinent to the current instruction for which guidance is being presented to the end user, this functional block extracts the list of Parts or objects that are required for (or are relevant to) the instruction. This list of Parts will typically be a subset of the list of all Parts defined by the system.

History of Estimated Camera Pose 432

A memory store contains the estimated pose (X/Y/Z, Yaw/Pitch/Roll) of the Camera with respect to the FOR, as a function of time. The current estimated camera pose is utilized by downstream functional blocks to relate observed positions of Parts to the FOR coordinate system, and to guide the rendering of computer graphics so that they will appear to be located at intended coordinates in the FOR.

Inertial Sensor (Optional) 434

A set of accelerometers or gyros measure acceleration in 3 or 6 dimensions (X,Y,Z, Yaw/Pitch/Roll). The Inertial Sensor is physically fixed to the Camera of the system, and the spatial relationship between the Camera's focal plane array and the origin of the Inertial Sensor is known by design or by measurement. The sensor outputs a time sequence of quantized acceleration measurements.

Memory of Acceleration Measurements vs. Time 436

A memory store records the measurements made by the Inertial Sensor as a function of time. Memory is required only if the inertial sensor is present.

Integrator 438 (Required Only if Inertial Sensor Present)

The integrator integrates acceleration measurements vs. time to estimate velocity, and integrates velocity vs. time to estimate changes in position. Combined with knowledge of the Inertial Sensor's spatial relationship to the Camera, this enables estimation of changes to Camera pose as a function of time. However, due to noise or measurement errors in the Inertial Sensor, the Integrator's estimate of camera pose is subject to drift as a function of time, with the magnitude of error increasing according to the square of differential time. The integrator outputs estimated motion of the Camera.

Distinctive Visual Scene Features Tracker (Optional) 440

A computer vision algorithm inspects the current and recent images of the scene (and optionally the estimated current pose of the camera) to find point or linear features that can be (1) consistently found again in adjacent and temporally near scene images and (2) appear to be fixed with respect to the FOR. Data about such features is computed and stored for some period of time, including their location in the image, and descriptions of their appearance (which may be an image template or other mathematical representations). The 3D locations of scene features relative to the Camera are inferred by analyzing their relative movement between images as they move (or the Camera moves). The estimation of features' 3D locations can be improved or accelerated by calculating differential changes in camera pose based on (optional) input of the estimated current pose of the camera.

Simultaneous Localization and Mapping 442

SLAM processes inputs (a,b,c) time-sequential observations of features (e.g. Parts or SIFT scene features) and their locations in the current scene image, (d) estimated camera motion from Integrator of Inertial Sensor and (e) coordinates of fiducial markers fixed to the environment, expressed in World or FOR coordinate system, to determine the correspondence of features between sequential images of the scene, encompasses a model of the relationship between 2D image locations and 3D spatial locations, and infers the relative position and motion of (a) the observer (Camera) with respect to the features and (b) the features with respect to the observer. SLAM also encompasses algorithms that attempt to discriminate between features that are fixed with respect to the FOR and features that are moving with respect to the FOR.

SLAM can accept error-prone time sequential observations of the features' positions relative to the Camera from one or more observing sources, and reconcile those estimations using certain control parameters, to provide an optimal estimate of the true Camera and features' pose and motion. For example, when the Camera's pose is estimated based on observation of a Fiducial Marker that is fixed to the FOR, this input can be given higher weight (or trust) to update the estimated position of the Camera. With lesser weight (or trust), pose/movement calculations can be made using the detected locations of Parts w/r to the Camera. If available, Camera-relative feature positions' calculations from the Distinctive Visual Scene Features Tracker functional block can also be used to estimate the camera's relative change in pose from previous observations.

Under conditions of high speed motion for short periods of time, it may be the case that none of the computer vision methods can provide a confident estimate of camera pose or movement, but the Integrator of the Inertial Sensor would provide relatively reliable estimates of changes in Camera pose under these conditions, and so is given higher weight when higher accelerations are measured.

A pre-loaded Memory of Fiducial Markers provides coordinate transformations that enable the pose of the camera in World or FOR coordinates to be calculated, given the 6D pose (relative to the camera) of a fiducial marker (found in the FOV) that is fixed to the environment.

SLAM also contains a Dynamics Model 444 describing constraints on the possible dynamic motion of the camera. For instance, translational or rotational inertia and maximum velocities and accelerations may be defined, and can be used to help discriminate noise or jitter on the input signals from true movement.

SLAM outputs an estimated Camera pose in World or FOR coordinates.

Predict Camera Motion 446

This block processes the history of estimated Camera pose and the estimated camera motion from Integrator of Inertial Sensor to output a predicted Camera pose. Given the history of the Camera's pose as a function of time, and recent data from the inertial subsystem, this functional block predicts the pose of the camera at the moment in time corresponding to when the next scene image (to be analyzed by functional blocks attached to its outputs) was (or will be) captured. Downstream blocks can use this prediction to optimize their search for visual features in the next scene image and/or to accelerate their inference of how objects' 3D/6D pose with respect to the camera will have changed in the next scene image. Specifically, the classifiers may use the previous pose estimate plus a prediction of camera motion. In other embodiments, this functional block may be combined with the "Hypothesize Camera Motion" sub-block of the SLAM function block, as depicted in FIG. 5.

Find and Identify Fiducial Markers 448

A computer vision algorithm attempts to detect, locate, and uniquely identify patterns (Fiducial Markers) specifically emplaced upon Parts or fixed portions of the FOR from sequential digital images of the scene. The spatial relationship between a given Fiducial Marker and Part to which it is affixed (or to the FOR if it is fixed to the FOR) is known a priori and embodied in the Memory of Fiducial Markers. A commonly used fiducial marker is a square black ring on a white background, which encompasses a unique identifier pattern. The unique identifier pattern could be a symbol, such as a letter, number, or icon, or it could be an arrangement of smaller pre-defined shapes (squares, triangles, circles, concentric rings) that comprise a binary bit code. A 2D bar code is one embodiment of an identifier pattern.

The block outputs the 2D Location, Identity, and reference points (e.g. corners) of Fiducial markers in the scene image Estimate 6D Pose of Markers w/r to Camera 450

Given the identity, 2D location, and reference points of a fiducial marker in the scene image, as well as the physical length/width of each fiducial marker, this block calculates the 6D pose of each marker with respect to the camera as a function of time. If the optional estimated pose input is present, it can help to accelerate the calculation of fiducial markers' positions Memory of Fiducial Markers 452

This pre-loaded memory contains a look-up table, typically indexed by marker identity. It provides prior knowledge of whether the specific marker was fixed to the World or fixed to a particular Part, as well as each fiducial marker's physical dimensions and its coordinate transformation (i.e. 6D offset) with respect to the Part (or FOR if fixed to the environment) to which it is attached.

Relate Parts Markers to Parts Locations 454

This block receives coordinate transformations between Fiducial Markers and the Parts to which they are attached and the estimated 6D positions of fiducial markers relative to the Camera, and calculates the Camera-relative 6D pose of Parts in the FOV, given the 6D pose of Fiducial Markers attached to those parts.

Memory of Part Locations in Camera Field of View 456

The memory stores the 6D pose of parts found by fiducial markers and the 3D pose of parts recognized by Find and Identify Known Parts block.

Convert Part Locations from Camera-Relative to World Coordinates 458

Knowing the 3D or 6D positions of Parts w/r to the Camera and knowing the Camera pose w/r to the World, this block performs a coordinate transformation to represent the positions of the Parts w/r to the World or FOR.

Memory of Part Locations in World 460

The memory stores 3D and/or 6D poses of Parts w/r to the World or FOR and the 6D pose of Camera w/r to the World or FOR.

Templates for Recognizing Parts and Machine 462

Using computer vision algorithms and image processing techniques, calibration data can be gathered and stored in memory for a set of defined Parts that describes characteristic features of the Parts when imaged by a camera. A simple example would be image templates that store the outline shape of each part from a multitude of poses, where each such image template is recorded with the relative pose of the Part w/r to the Camera at the time when the template was generated.

Find and Identify Known Parts 464

This block embodies a computer vision algorithm that utilizes provided Templates for Recognizing Parts and Machine and performs analysis on live and recent images of the scene, to detect, locate, and identify any of the defined Parts in the image and output the 2D positions of identified parts in the FOV. The algorithm may include features to compensate for variations in lighting, slight differences in the current pose of a Part vs. its pose when an approximately matching Template was created, and rotation of the Part in the scene.

Estimate 3D Position of Found Parts w/r to Camera 466

Having found the 2D location of defined Parts in the scene image, this functional block estimates the 3D locations of the Parts w/r to the Camera. Examples of implementation include: using knowledge of the Parts' physical size vs. image size to estimate range, assuming that all Parts are situated at ground level, and estimating the location of the ground plane that would best fit this assumption. If present, the optional estimated current pose of the camera can be used to accelerate the analysis performed by this block.

Determine Onscreen, Off-Screen, and Not-Found Parts 468

Given a list of all Parts relevant to the current instruction being presented to the user, locations of Parts relative to the World or FOR, locations of Parts currently in the FOV relative to the Camera and an estimate pose of the Camera relative to the World or FOR, this functional block determines which parts are currently within the camera FOV, which parts are within the Memory of Part Locations in the World but outside Camera FOV, and which Parts are not within the Memory of Part Locations In World. The block outputs (a) a list of parts in FOV, (b) a list of parts outside FOV and (c) a list of all parts relevant to the current instruction Render Overlays for Onscreen Parts 470

A rendering application receives a list of parts in FOV and 3D and/or 6D poses of the Parts with respect to the Camera. For those detected and identified Parts that are in the current image scene, the rendering application renders outline graphics, icons, or other symbology in such a way that the graphics will register upon the location of those Parts in the scene. A simple example would be a rectangular bounding box around the part. A more complex example would be an outline mechanical drawing of the part that has been adjusted and scaled to reflect the 6D pose of the part w/r to the camera. The overlay may include metadata about the confidence of the part detection and identification. It may include qualifying visual attributes such as color, line type, line thickness, temporal changes (e.g. blinking), or attached symbols that indicate additional information about each part, such as (a) whether it is relevant to the current step of a procedure being performed, (b) arrows showing the direction in which the part should be moved, (c) symbols illustrating actions to be performed upon the object (e.g. using a tool on the object), (d) the part number of the Part or other identifying labeling. The rendering application produces a graphical overlay that visually references and optionally annotates the locations of Parts within the FOV.

Render Directional Icons for Off-Screen Parts 472

A rendering application receives (a) a 3D and/or 6D poses of Parts w/r to the World or FOR, (b) a 6D pose of Camera w/r to the World or FOR and (c) a list of parts outside FOV. For Parts which are determined to be relevant to the current instruction, and whose location is in the FOR is known, and which are not presently visible in the image of the scene, the rendering application renders graphical indicators that indicate to the end user the relative direction of these Parts with respect to the current view of the Camera and/or the Parts' proximity to the Camera. For example, direction arrows could be drawn at the perimeter of the scene image, with arrows on the left edge indicating that the camera should be rotated toward the left in order to bring the Part within the field of view, arrows on the right edge of the image indicating that the Part(s) lie beyond the right edge of the Field of View, arrows on the top edge indicating that the part is further away in the forward direction than is covered by the Camera FOV, and arrows on the bottom edge indicating that the part is either nearer than the bottom edge of the Camera FOV, or the part lies behind the camera. The rendering application produces a graphical overlay conveying the camera-relative spatial relationships of parts beyond the FOV but believed to be within the FOR.

Render Checklist for Parts 474

Figure 7:
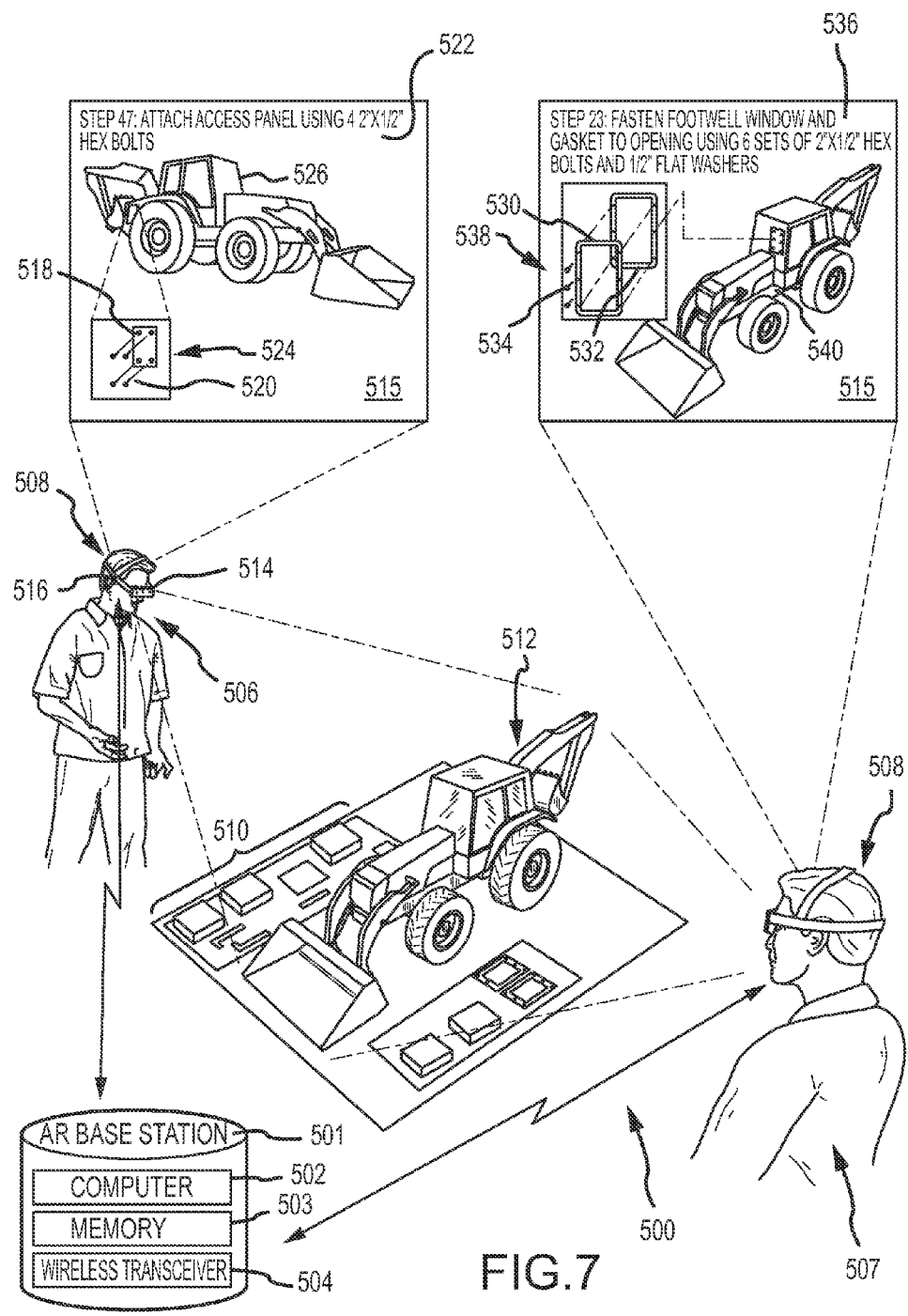
FIG. 7 is an embodiment of a multi-user AR system.

A rendering application receives a list of parts relevant to the current instruction. The rendering application creates a textual or graphical listing of Parts relevant to the current instruction, with additional data regarding their status. Status information could include whether the part has been located by the End User or the system, for example. The status information may be shown as text or as visual attributes, such as color, attached icon symbols, or highlighting. The rendering application produces a graphical overlay showing part listing and status A multi-user AR system 500 is depicted in FIG. 7. Some tasks may require multiple users to perform the task at all, or at least to perform the task in a required timeframe. In some situations, multiple users could all use a single-user AR system to identify and locate the parts and perform each instruction. In other situations it may be advantageous to tailor the AR display to each user's FOV and possibly to different instructions. To perform a single instruction, different users may be provided with different displays to locate the required parts and different graphics to work together to execute the instruction. Alternately, different users may perform different instructions requiring different parts. The users' AR systems may be completely independent, each system loaded with instructions and parts list for the particular user. Alternately, the users' AR systems may operate in concert with each other to perform the same instruction, or to ensure instructions are performed in a specified order. In this latter case, the AR systems may be provided with wireless transceivers in order to share data and communicate with each other. The computer processing capability may be shared among the linked systems. Alternately, a master computer system could be provided to perform all of the required processing and to forward data and instructions to the individual AR systems. The master computer system could be located in one of the hand-held or head-mounted AR systems, e.g. a "master" unit, or could be a separate stand alone processing center separate from any of the hand-held or head-mounted units. A multi-user system would have a distinct advantage in building the identities and locations of the parts; multiple users scanning their respective FOVs from different poses across the scene. The entire FOR would be covered more quickly and from different poses, thus improving the speed and confidence with which the parts inventory is built.

This embodiment of multi-user AR system 500 comprises a base-station 501 that comprises central computing resources 502, memory 503 and a wireless transceiver 504. The base-station 501 coordinates the efforts of two users 506 and 507 each provided with a head-mounted AR system 508 (or hand-held systems). The memory is loaded with the set of instructions for an up-armor kit 510 for an IMHEE 512 for two users, a list of parts for the kit and templates (fiducial markers and models) for the parts and scene. The memory will also store data received from each user's AR system such as video, part identities and locations of parts acquired, incorrect parts etc. The computing resources are programmed to assign instructions to each user and to transmit the instructions and parts list accordingly. As the users scan the FOR, the base-station builds the inventory of parts and tracks their locations. As the users perform the instructions, the base-station updates the classifiers and the parts inventory. The base-station may be able to adapt, altering the instructions for one user to, for example, assist the other to find certain parts, to execute an instruction, or to perform additional instructions if he or she is working more quickly. The system may adapt the rendered instructions to the different users based in part on what parts are in their respective FOV.

Head-mounted AR system 508 comprises a camera 514 for capturing images of the scene in a current FOV and a display 515 for viewing AR renderings of parts on the scene and instructions for assembling the parts on the IMHEE 512. In this embodiment, the system also comprises a wireless transceiver 516 for sending and receiving data and information from the base-station, and possibly directly with other head-mounted AR systems. The head-mounted AR system includes at least sufficient computing resources and memory to gather and receive data and to execute the instructions. The system may comprise computing resources and memory to perform a portion of the processing locally. Each head-mounted AR system may be configured to perform the processing locally that is specific to a user, e.g. pose estimation, determination of which of the user's assigned parts are inside or outside the user's current FOV, etc. allowing the base-station to perform more global functions that involve processing data from multiple users and coordinating the actions of the multiple users.

In this case, user 506 is assigned the task to attach an access panel 518 using 4 hex bolts 520 to the back right side of the IMHEE 512. That user's AR system tracks and renders icons for the parts over the scene and then renders instructions including text 522 and an illustration 524 using the access panel and hex bolts over a computer-generated model 526 of the IMHEE based on the estimated camera pose for user 506. User 507 is assigned the task to attach a window 530 and gasket 532 using sets of hex bolts and flat washers 534 to the front of the IMHEE 512. That user's AR system tracks and renders icons for the parts over the scene and then renders instructions including text 536 and an illustration 538 using the window, and gasket and hex bolts/flat washer sets over a computer-generated model 540 of the IMHEE based on the estimated camera pose for user 507.

Figure 8:
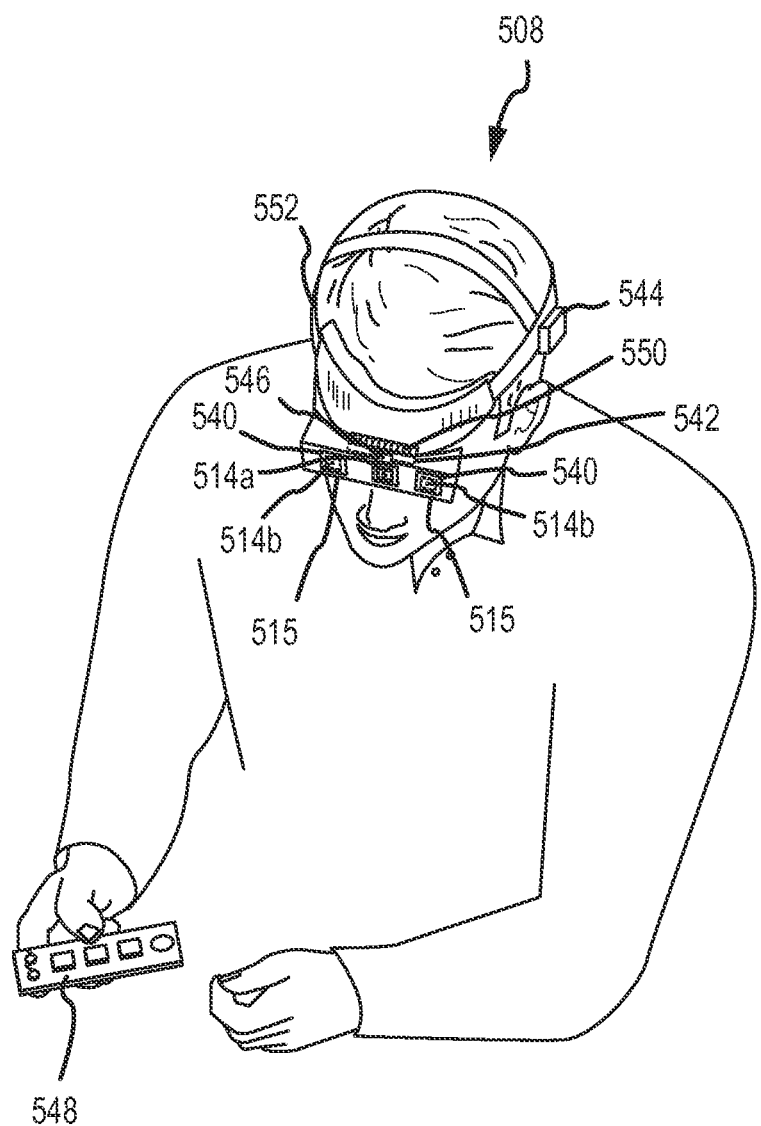
FIG. 8 is an embodiment of a head-mounted AR display.

An embodiment of a head-mounted AR system 508 is depicted in FIG. 8. This particular system comprises a single camera 514a or dual cameras 514b and dual displays 515, one per eye. The displays are translucent, employing transmissive optics 540 to pass the light from the scene directly to the user to passively display the scene in the current FOV. A computer 542 renders the parts icons and instructions actively on the display. A transceiver 544 sends and receives data and information with the base-station or other head-mounted (or hand-held) AR systems. This system also includes an inertial sensor 546 and a hand-held keypad 548 (or some other user interface). This head-mounted system attaches the display via a hinge 550 to an adjustable headband 552 allowing the user to flip the AR display up. Other configurations and capabilities for the head-mounted AR display are envisioned.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. An augmented reality (AR) system, comprising:
   a camera for recording images within a field-of-view (FOV) scanned over a larger field-of-regard (FOR) in a scene including parts;
   a display configured to display images of the scene in a FOV overlapping the camera FOV;
   one or more memory units;
   templates for the parts stored in said one or more memory units;
   a plurality of instructions stored in said one or more memory units, each said instruction including a list of parts and instructions for the use of those parts; and
   a computer comprising:
      a classifier module that processes images of the scene using the templates to locate and identify the parts in the scene over the FOR, said classified parts' identities and locations relative to the FOR stored in said one or more memory units and retained in said memory units for parts that lie both inside the current FOV and outside the current FOV stored in said one or more memory units;
      a pose module that processes data from images of the scene to estimate camera pose relative to the FOR;
      an instruction module that retrieves an instruction and a list of all parts relevant to the instruction;
      a tracker module that for each instruction determines from the list of all parts relevant to the instruction, locations of those parts relative to the FOR and the estimated camera pose relative to the FOR, the list of parts and the locations of those parts that lie within the current FOV and those parts that lie outside the current FOV;
      a parts rendering module that for each instruction receives the list of parts within the current FOV and a pose for each of those parts with respect to the camera and renders parts icons registered to parts within the current FOV and receives the list of parts outside the current FOV, a pose for each of those parts with respect to the FOR and the estimated camera pose and renders parts icons with location indicators for parts outside the current FOV over the displayed images of the scene; and
      an instruction-rendering module that renders the instructions for the use of those parts.

2. The AR system of claim 1, wherein the parts comprise mechanical parts and tools.

3. The AR system of claim 2, wherein the plurality of instructions comprises instructions to use the tools to assemble or disassemble the mechanical parts.

4. The AR system of claim 3, wherein the plurality of instructions comprises instructions to use the tools to assemble or disassemble the mechanical parts onto or off of a vehicle.

5. The AR system of claim 4, wherein the instructions rendering module renders the instruction on the display for the assembly or disassembly of the parts, said instruction including an illustration of the assembly or disassembly.

6. The AR system of claim 1, wherein the camera FOV is scanned over the FOR to identify and locate all of the parts to perform all of the instructions and to store the identities and location of all of the parts, wherein the FOR is scanned and the parts stored prior to the use of any of the parts or the FOR is scanned as the parts icons and instructions are rendered as a user performs the instructions.

7. The AR system of claim 1, wherein the classifier module comprises:
    a fiducial marker classifier that detects fiducial markers on parts and uses the camera pose estimate to identify and locate the parts; and
    a parts classifier that uses the stored templates to detect parts and uses the camera pose estimate to identify and locate the parts.

8. The AR system of claim 7, wherein said pose module comprises:
    the fiducial marker classifier, said classifier detecting fiducial markers on non-part scene features and providing the scene features' identity and location in addition to the parts identity and locations;
    the parts classifier that provides identities and locations of parts;
    a visual scene feature classifier that identifies and locates points of interest in the scene; and
    an inertial sensor that estimates camera motion; and
    a camera pose estimator that processes inputs from at least two said sources and generates the estimated camera pose relative to the FOR.

9. The AR system of claim 1, wherein the tracker module that for each instruction determines any parts on the parts list that have not been identified and located, said parts rendering module rendering a list of non-identified parts on the display.

10. The AR system of claim 9, wherein the tracker tracks the FOR for scanned and detected but not identified objects in the FOR, said tracker generating instructions for where to look for a missing part either within the scanned FOR at a detected but not identified object or outside the scanned FOR, said instructions rendering module rendering the instructions.

11. The AR system of claim 1, wherein an integrated handheld or head-mounted unit includes the camera and the display.

12. The AR system of claim 1, wherein the system is a multi-user system comprising multiple cameras and displays for respective users, said multiple users work together to perform the same instruction with the same parts, said system rendering different parts icons depending on their respective FOV.

13. The AR system of claim 1, wherein the system is a multi-user system comprising multiple cameras and displays for respective users, said multiple users work together to perform different instructions with different parts, said system rendering different parts icons depending on their respective parts lists and different FOV, said system rendering the different instructions to the different users.

14. An augmented reality (AR) system, comprising:
    a camera for recording images within a field-of-view (FOV) scanned over a larger field-of-regard (FOR) in a scene including parts;
    a display configured to display images of the scene in a FOV overlapping the camera FOV;
    one or more memory units;
    templates for the parts stored in said one or more memory units;
    a plurality of instructions stored in said one or more memory units, each said instruction including a list of parts and instructions for assembling or disassembling those parts; and
    a computer comprising:
        a classifier module that processes images of the scene using the templates to locate and identify the parts in the scene over the FOR, said classified parts' identities and locations relative to the FOR stored in said one or more memory units and retained in said memory units for parts that lie both inside the current FOV and outside the current FOV, said classifier module comprising a fiducial marker classifier that detects fiducial markers on parts and provides the part's identity and location and a parts classifier that uses the stored templates to detect parts and provides the part's identity and location;
        a pose module that processes data from images of the scene to estimate camera pose relative to the FOR, said pose module comprising at least two sources selected from
            the fiducial marker classifier, said classifier detecting fiducial markers on non-part scene features and providing the scene features identity and location in addition to the parts identity and locations;
            the parts classifier that provides identities and locations of parts;
            a visual scene feature classifier that identifies and locates points of interest in the scene; and
            an inertial sensor that estimates camera motion; and
        a camera pose estimator that processes inputs from at least two said sources and generates the estimated camera pose relative to the FOR;
        an instruction module that retrieves an instruction and a list of all parts relevant to the instruction;
        a tracker module that for each instruction determines from the list of all parts relevant to the instruction, locations of those parts relative to the FOR and the estimated camera pose relative to the FOR, a first list of parts and the locations of those parts that lie within the current FOV, a second list of parts that lie outside the current FOV and a third list of parts that have not been identified and located;
        a parts rendering module that for each instruction receives the first list of parts within the current FOV and a pose for each of those parts with respect to the camera and renders parts icons registered to parts within the current FOV, receives the second list of parts outside the current FOV, a pose for each of those parts with respect to the FOR and the estimated camera pose and renders parts icons with location indicators for parts outside the current FOV over the displayed images of the scene and receives the third list of parts and renders a list of those non-identified parts on the display; and
        an instruction-rendering module that renders the instructions for the use of those parts.

15. A method of augmented reality (AR), comprising:
    scanning a camera's field-of-view (FOV) over a larger field-of-regard (FOR) to record images of a scene including parts;
    processing the images to locate and identify parts in the scene relative to the FOR and to store and retain the parts' identities and locations for parts that lie both inside the current FOV and outside the current FOV;
    displaying an image of the scene in a FOV that overlaps the camera FOV;
    processing images of the scene from a current FOV to estimate a pose relative to the FOR; and
    for each of a sequence of instructions, each said instruction including a list of all parts and instructions for the use of those parts,
        using the locations of the parts relative to the FOR and the estimated pose relative to the FOR to determine a first list of the parts that lie within the current FOV and a second list of the parts that lie outside the current FOV from the list of parts associated with the execution of that instruction;

using the first list of parts within the current FOV and a pose for each of those parts with respect the camera to render parts icons registered to the parts within the current FOV over the displayed image of the scene from the current FOV;

using the second list of parts that lie outside the current FOV, a pose for each of those parts with respect the FOR and the estimated camera pose to render parts icons with location indicators for the parts outside the current FOV over the displayed image of the scene from the current FOV; and rendering the instructions for the use of those parts.

16. The method of claim 15, wherein the parts comprise mechanical parts and tools.

17. The method of claim 16, wherein the plurality of instructions comprise instructions to use the tools to assemble or disassemble the mechanical parts onto or off of a vehicle.

18. The method of claim 15, wherein processing the images from different FOV to locate and identify parts in the scene comprises processing the images with a fiducial marker classifier that detects fiducial markers on parts and uses the camera pose estimate to identify and locate the parts and a parts classifier that uses the stored templates to detect parts and uses the camera pose estimate to identify and locate the parts, and wherein processing images of the scene from the current FOV comprises processing the images with at least two sources selected from the fiducial marker classifier, said classifier detecting fiducial markers on non-part scene features and providing the scene features' identity and location in addition to the parts identity and locations, the parts classifier that provides identities and locations of parts, a visual scene feature classifier that identifies and locates points of interest in the scene and an inertial sensor that estimates camera motion, a camera pose estimator processing inputs from at least two said sources and generates the estimated camera pose.

19. The method of claim 15, further comprising:

maintaining a third list of located but not identified objects in the FOR, and for each said instruction, determining any parts on the third list that have not been identified and located and rendering a list of non-identified parts on the display;

generating and rendering instructions for where to look for a missing part from among the third list of located but not identified object in the FOR.

20. The method of claim 15, wherein multiple users work together to perform the same instruction with the same parts, said method rendering different parts icons on the displayed image depending on the users' respective FOV or to perform different instructions with different parts, said method rendering different parts icons and instructions on the displayed image depending on users' respective parts lists and different FOV.

\* \* \* \* \*